US012376590B2

(12) United States Patent
Satchivi et al.

(10) Patent No.: US 12,376,590 B2
(45) Date of Patent: Aug. 5, 2025

(54) COMPOSITIONS COMPRISING PYRIDINE CARBOXYLATE HERBICIDES AND AZOLE CARBOXYLATE SAFENERS

(71) Applicant: Corteva Agriscience LLC, Indianapolis, IN (US)

(72) Inventors: Norbert M. Satchivi, Carmel, IN (US); Jeremy Kister, Carmel, IN (US)

(73) Assignee: CORTEVA AGRISCIENCE LLC, Indianapolis, IN (US)

( * ) Notice: Subject to any disclaimer, the term of this patent is extended or adjusted under 35 U.S.C. 154(b) by 798 days.

(21) Appl. No.: 17/291,107

(22) PCT Filed: Oct. 30, 2019

(86) PCT No.: PCT/US2019/058788
§ 371 (c)(1),
(2) Date: May 4, 2021

(87) PCT Pub. No.: WO2020/096832
PCT Pub. Date: May 14, 2020

(65) Prior Publication Data
US 2021/0400969 A1    Dec. 30, 2021

Related U.S. Application Data

(60) Provisional application No. 62/756,173, filed on Nov. 6, 2018.

(51) Int. Cl.
*A01N 43/40* (2006.01)
*A01N 25/32* (2006.01)

(52) U.S. Cl.
CPC ............. *A01N 43/40* (2013.01); *A01N 25/32* (2013.01)

(58) Field of Classification Search
CPC .................. A01N 43/40; A01N 25/32
See application file for complete search history.

(56) References Cited

U.S. PATENT DOCUMENTS

| | | | |
|---|---|---|---|
| 4,044,140 A | 8/1977 | Sherlock | |
| 4,698,093 A | 10/1987 | Lee et al. | |
| 4,877,897 A | 10/1989 | Swithenbank et al. | |
| 9,179,676 B2 | 11/2015 | Hoffmann et al. | |
| 9,521,847 B2 | 12/2016 | Satchivi et al. | |
| 9,611,282 B2 | 4/2017 | Eckelbarger et al. | |
| 9,763,445 B2 | 9/2017 | Satchivi et al. | |
| 10,448,638 B2 | 10/2019 | Satchivi et al. | |
| 11,363,812 B2 | 6/2022 | Wang et al. | |
| 11,363,816 B2 | 6/2022 | Kister et al. | |
| 12,029,217 B2 * | 7/2024 | Satchivi .............. | A01N 25/32 |
| 2003/0114311 A1 | 6/2003 | Balko et al. | |
| 2007/0093390 A1 | 4/2007 | Witschel et al. | |
| 2010/0137137 A1 | 6/2010 | Rosinger et al. | |
| 2011/0245157 A1 * | 10/2011 | Meng | |
| 2015/0005156 A1 | 1/2015 | Dash et al. | |
| 2015/0005165 A1 | 1/2015 | Hoffmann et al. | |
| 2016/0073632 A1 | 3/2016 | Satchivi et al. | |
| 2016/0135457 A1 | 5/2016 | Satchivi et al. | |
| 2016/0135458 A1 | 5/2016 | Satchivi et al. | |
| 2017/0064955 A1 | 3/2017 | Satchivi et al. | |
| 2019/0069549 A1 | 3/2019 | Satchivi et al. | |
| 2019/0069550 A1 | 3/2019 | Satchivi et al. | |
| 2020/0068888 A1 | 3/2020 | Kister et al. | |
| 2021/0161135 A1 | 6/2021 | Satchivi et al. | |
| 2021/0352899 A1 | 11/2021 | Kister et al. | |
| 2021/0386068 A1 | 12/2021 | Kister et al. | |
| 2021/0392888 A1 | 12/2021 | Satchivi et al. | |
| 2021/0392889 A1 | 12/2021 | Kister et al. | |
| 2021/0392890 A1 | 12/2021 | Kister et al. | |
| 2021/0392891 A1 | 12/2021 | Kister et al. | |
| 2021/0392892 A1 | 12/2021 | Satchivi et al. | |
| 2021/0400967 A1 | 12/2021 | Satchivi et al. | |
| 2021/0400968 A1 | 12/2021 | Satchivi et al. | |
| 2021/0400970 A1 | 12/2021 | Satchivi et al. | |
| 2022/0000109 A1 | 1/2022 | Satchivi et al. | |
| 2022/0000110 A1 | 1/2022 | Satchivi et al. | |
| 2022/0007644 A1 | 1/2022 | Kister et al. | |
| 2023/0009120 A1 | 1/2023 | Satchivi et al. | |

(Continued)

FOREIGN PATENT DOCUMENTS

| | | |
|---|---|---|
| CA | 3063094 A1 | 11/2018 |
| GB | 1565056 A | 4/1980 |
| WO | 03011853 A1 | 2/2003 |

(Continued)

OTHER PUBLICATIONS

Examination Report of Pakistan Patent Application No. 330/2018, mailed May 9, 2018, 5 Pages Applicant: (Dow Agrosciences LLC, dated Aug. 16, 2019).
Extended European Search Report for European Application No. 18798826.6, mailed Nov. 25, 2020, 8 Pages.
International Preliminary Report on Patentability for International Application No. PCT/US2018/031004, mailed Nov. 21, 2019, 7 Pages.
International Preliminary Report on Patentability for International Application No. PCT/US2019/058779, mailed May 20, 2021, 9 Pages.
International Preliminary Report on Patentability for International Application No. PCT/US2019/058788, mailed May 20, 2021, 09 Pages.
International Preliminary Report on Patentability for International Application No. PCT/US2019/058795, mailed May 20, 2021, 9 Pages.

(Continued)

*Primary Examiner* — Alma Pipic

(57) ABSTRACT

Disclosed herein are safened compositions comprising (a) a pyridine carboxylate herbicide or an agriculturally acceptable N-oxide, salt or ester thereof and (b) an azole carboxylate safener or agriculturally acceptable salt or ester thereof. Also disclosed herein are methods of controlling undesirable vegetation, comprising applying to vegetation or an area adjacent the vegetation or applying in soil or water to control the emergence or growth of vegetation (a) a pyridine carboxylate herbicide or an agriculturally acceptable N-oxide, salt or ester thereof and (b) an azole carboxylate safener or agriculturally acceptable salt or ester thereof.

15 Claims, No Drawings

(56) References Cited

U.S. PATENT DOCUMENTS

2023/0022569 A1     1/2023    Kister et al.

FOREIGN PATENT DOCUMENTS

| | | |
|---|---|---|
| WO | 2009029518 A2 | 3/2009 |
| WO | 2013/014165 A1 | 1/2013 |
| WO | 2013085991 A1 | 6/2013 |
| WO | 2014018398 A1 | 1/2014 |
| WO | 2014018402 A1 | 1/2014 |
| WO | 2014018407 A1 | 1/2014 |
| WO | 2014116910 A1 | 7/2014 |
| WO | 2014116927 A1 | 7/2014 |
| WO | 2014151005 A1 | 9/2014 |
| WO | 2016/044229 A2 | 3/2016 |
| WO | 2016044276 A1 | 3/2016 |
| WO | 2016044282 A1 | 3/2016 |
| WO | 2016044283 A1 | 3/2016 |
| WO | 2016044285 A1 | 3/2016 |
| WO | 2018/208582 A1 | 11/2018 |
| WO | 2019046666 A1 | 3/2019 |
| WO | 2019046667 A1 | 3/2019 |
| WO | 2019060366 A1 | 3/2019 |
| WO | 2019195495 A1 | 10/2019 |
| WO | 2019195496 A1 | 10/2019 |
| WO | 2020096832 A1 | 5/2020 |

OTHER PUBLICATIONS

International Preliminary Report on Patentability for International Application No. PCT/US2019/059592, mailed May 20, 2021, 9 Pages.
International Preliminary Report on Patentability for International Application No. PCT/US2019/059594, mailed May 20, 2021, 09 Pages.
International Preliminary Report on Patentability for International Application No. PCT/US2019/059596, mailed May 20, 2021, 10 Pages.
International Preliminary Report on Patentability for International Application No. PCT/US2019/059599, mailed May 20, 2021, 10 Pages.
International Preliminary Report on Patentability for International Application No. PCT/US2019/059601, mailed May 20, 2021, 10 Pages.
International Preliminary Report on Patentability for International Application No. PCT/US2019/059604, mailed May 20, 2021, 9 Pages.
International Preliminary Report on Patentability for International Application No. PCT/US2019/059605, mailed May 20, 2021, 9 Pages.
International Preliminary Report on Patentability for International Application No. PCT/US2019/059606, mailed May 20, 2021, 9 Pages.
International Preliminary Report on Patentability for International Application No. PCT/US2019/059609, mailed May 20, 2021, 9 Pages.
International Preliminary Report on Patentability for International Application No. PCT/US2019/059612, mailed May 20, 2021, 9 Pages.
International Preliminary Report on Patentability for International Application No. PCT/US2019/059613, mailed May 20, 2021, 9 Pages.
International Preliminary Report on Patentability for International Application No. PCT/US2019/059615, mailed May 20, 2021, 10 Pages.
International Preliminary Report on Patentability for International Application No. PCT/US2019/059617, mailed May 20, 2021, 9 Pages.
International Search Report and Written Opinion for International Application No. PCT/US2014/024745, mailed Jul. 7, 2014, 9 Pages.
International Search Report and Written Opinion for International Application No. PCT/US2018/031004, mailed Jul. 26, 2018, 8 Pages.
International Search Report and Written Opinion for International Application No. PCT/US2019/058779, mailed Feb. 19, 2020, 11 Pages.
International Search Report and Written Opinion for International Application No. PCT/US2019/058795, mailed Feb. 19, 2020, 11 Pages.
International Search Report and Written Opinion for International Application No. PCT/US2019/059592, mailed Apr. 2, 2020, 12 Pages.
International Search Report and Written Opinion for International Application No. PCT/US2019/059594, mailed Mar. 30, 2020, 12 Pages.
International Search Report and Written Opinion for International Application No. PCT/US2019/059596, mailed Apr. 2, 2020, 13 Pages.
International Search Report and Written Opinion for International Application No. PCT/US2019/059599, mailed Mar. 19, 2020, 13 Pages.
International Search Report and Written Opinion for International Application No. PCT/US2019/059601, mailed Apr. 2, 2020, 13 Pages.
International Search Report and Written Opinion for International Application No. PCT/US2019/059604, mailed Apr. 2, 2020, 12 Pages.
International Search Report and Written Opinion for International Application No. PCT/US2019/059605, mailed Mar. 19, 2020, 12 Pages.
International Search Report and Written Opinion for International Application No. PCT/US2019/059606, mailed Apr. 2, 2020, 12 Pages.
International Search Report and Written Opinion for International Application No. PCT/US2019/059609, mailed Apr. 2, 2020, 12 Pages.
International Search Report and Written Opinion for International Application No. PCT/US2019/059612, mailed Mar. 19, 2020, 12 Pages.
International Search Report and Written Opinion for International Application No. PCT/US2019/059613, mailed Mar. 9, 2020, 12 Pages.
International Search Report and Written Opinion for International Application No. PCT/US2019/059615, mailed Apr. 24, 2020, 13 Pages.
International Search Report and Written Opinion for International Application No. PCT/US2019/059617, mailed Apr. 2, 2020, 12 Pages.
Bonneville Power Administration., "Sulfentrazone Herbicide Fact Sheet," U.S. Department of Energy, 2004, pp. 1-9.
Official Action for Eurasian Patent Application No. 201992666, dated Nov. 9, 2021 for Dow Agrosciences LLC, 3 Pages, English language translation appended thereto (3 pages).
Official Action for Eurasian Patent Application No. 201992666, dated Feb. 17, 2021 for Dow Agrosciences LLC, 3 Pages, English language translation appended thereto (3 pages).
Van-Assche C. J., et al., "Photosystem Ii Inhibiting Chemicals: Molecular Interaction Between Inhibitors and a Common Target," Biochemical Responses Induced by Herbicides, ACS Publications, 1982, pp. 1-21.
Official Action for Eurasian Patent Application No. 210992666, dated Nov. 9, 2021 for Dow AgroSciences LLC, English Translation Received Nov. 23, 2021, 5 Pages.
Official Action for Eurasian Patent Application No. 201992666, dated Feb. 17, 2021 for Dow Agrosciences LLC, English Translation Received Feb. 24, 2021, 6 Pages.
Aim EC Herbicide label, FMC Corporation, May 2, 2017.
Bayer., "An Integrated Approach to Manage Weeds," Crop Science, Retrieved from Internet URL: https://www.cropscience.bayer.us/articles/cp/an-integrated-approach-to-manage-weeds, No Pagination, 2016, pp. 1-3.

(56) References Cited

OTHER PUBLICATIONS

Official Action for Eurasian Patent Application No. 201992666, dated Nov. 23, 2021 for Dow Agrosciences LLC, Dec. 9, 2019, 3 Pages.
Official Action for Eurasian Patent Application No. 201992666, dated Feb. 24, 2021 for Dow Agrosciences LLC, Dec. 9, 2019, 3 Pages.

* cited by examiner

COMPOSITIONS COMPRISING PYRIDINE CARBOXYLATE HERBICIDES AND AZOLE CARBOXYLATE SAFENERS

CROSS REFERENCE TO RELATED APPLICATION

This application is the National Stage Entry of International Application No. PCT/US19/58788, filed on Oct. 30, 2019, which claims the benefit of priority of U.S. Provisional Application No. 62/756,173, filed Nov. 6, 2018, both of which are incorporated by reference herein in their entirety.

FIELD OF THE DISCLOSURE

The disclosure includes safened compositions comprising a pyridine carboxylate herbicide and an azole carboxylate safener, as well as methods of controlling undesirable vegetation using the same.

BACKGROUND

Many recurring problems in agriculture involve controlling the growth of undesirable vegetation that can, for instance, negatively affect the growth of desirable vegetation. To help control undesirable vegetation, researchers have produced a variety of chemicals and chemical formulations effective in controlling such unwanted growth.

In some cases, although a herbicide may be effective in controlling undesirable vegetation, it may also have a phytotoxic effect on a crop and cause injury or even kill the crop. there exists a need for new herbicides combined with safeners that limit the phytotoxicity of the herbicidal active ingredient with desired crops.

SUMMARY

Disclosed herein are safened compositions that may be used as a herbicides, for example, in crops. The safened compositions may contain (a) a pyridine carboxylate herbicide or agriculturally acceptable N-oxide, salt, or ester thereof and (b) an azole carboxylate safener or an agriculturally acceptable salt or ester thereof. The weight ratio of (a) to (b) can be from 1:5 to 5:1 (e.g., from 1:3 to 3:1, or from 1:2 to 2:1).

In some aspects, the safened composition comprises (a) a pyridine carboxylate herbicide defined by Formula (I):

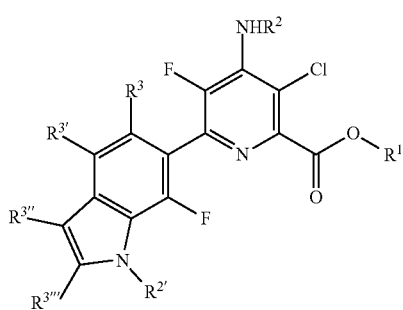

Formula I wherein:
$R^1$ is cyanomethyl or propargyl;
$R^2$ and $R^{2'}$ are independently hydrogen, $C_1$-$C_6$ alkyl, formyl, alkoxycarbonyl, or acyl;
$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof; and
(b) an azole carboxylate safener, or an agriculturally acceptable salt or ester thereof.

In some aspects, the safened composition comprises:
(a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

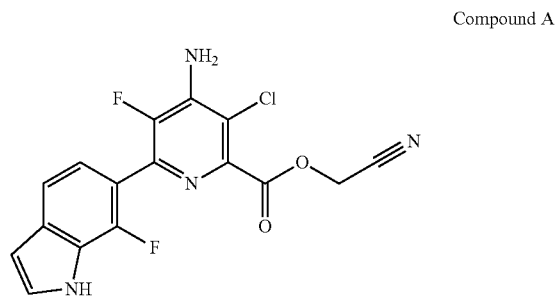 [SMILES: N#CCOC(=O)c1nc(-c2ccc3cc[nH]c3c2F)c(F)c(N)c1Cl]

Compound A or an agriculturally acceptable N-oxide, salt, or ester thereof; and
(b) an azole carboxylate safener or an agriculturally acceptable salt or ester thereof.

In some aspects, the safened composition comprises:
(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

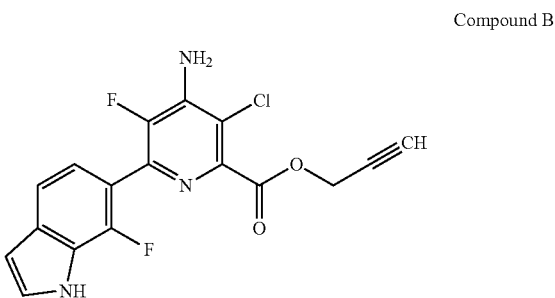 [SMILES: C#CCOC(=O)c1nc(-c2ccc3cc[nH]c3c2F)c(F)c(N)c1Cl]

Compound B or an agriculturally acceptable N-oxide, salt, or ester thereof; and
(b) an azole carboxylate safener or an agriculturally acceptable salt or ester thereof.

In some aspects, the azole carboxylate safener can be selected from the group consisting of selected from the group consisting of fenchlorazole, flurazole, furilazole, isoxadifen, mefenpyr, agriculturally acceptable salts or esters thereof, and combinations thereof.

In some aspects, the composition can further comprise an agriculturally acceptable adjuvant or carrier, an additional pesticide, or combinations thereof. In some aspects, the only active ingredients in the composition are (a) and (b). In some aspects, the composition can be provided as a herbicidal concentrate.

Also disclosed herein are methods of controlling undesirable vegetation, comprising applying to vegetation, to an area adjacent the vegetation, or to soil or water to control the emergence or growth of vegetation, a safened composition comprising: (a) a pyridine carboxylate herbicide or an agriculturally acceptable N-oxide, salt, or ester thereof; and (b) an azole carboxylate safener or an agriculturally acceptable salt or ester thereof. In some aspects, (a) and (b) are applied simultaneously. In some aspects, (a) and (b) are applied sequentially. In some aspects, (a) and (b) are applied pre-emergence of the undesirable vegetation. In some aspects, (a) is applied pre-emergently or post-emergently to the undesirable vegetation, and (b) is applied as seed treatment to the crop. In some aspects, (a) and (b) are applied post-emergence of the undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

In some cases, the pyridine carboxylate herbicide (a) can be applied in an amount of from 0.1 gram active ingredient per hectare (g ai/ha) to 300 g ai/ha (e.g., from 30 g ai/ha to 40 g ai/ha). In some cases, the azole carboxylate safener (b) can be applied in an amount of from 1 g ai/ha to 300 g ai/ha (e.g., from 30 g ai/ha to 40 g ai/ha). In some cases, (a) and (b) can be applied in a weight ratio of from 1:5 to 5:1 (e.g., from 1:3 to 3:1, or from 1:2 to 2:1).

The description below sets forth details of one or more aspect of the present disclosure. Other features, objects, and advantages will be apparent from the description and from the claims.

DETAILED DESCRIPTION

The present disclosure includes safened compositions comprising: (a) a pyridine carboxylate herbicide or an agriculturally acceptable N-oxide, salt, or ester thereof and (b) an azole carboxylate safener or an agriculturally acceptable salt or ester thereof. The present disclosure also includes methods for controlling undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

I. Definitions

Terms used herein will have their customary meaning in the art unless specified otherwise. The singular forms "a," and "the" include plural references unless stated otherwise. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient.

As used herein, "applying" a herbicide or herbicidal composition refers to delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" can include, for instance, dormant seeds, germinating seeds, emerging seedlings, plants propagating from vegetative propagules, immature vegetation, and established vegetation.

As used herein, the term "crop" refers to desired vegetation, for instance, plants that are grown to provide food, shelter, pasture, erosion control, etc. Example crops include cereals, legumes, vegetables, turf, grasslands, orchard and timber trees, grapevines, etc. Preferably, herbicides or herbicidal compositions have zero or minimal herbicidal effect on crops.

As used herein, the term "undesirable vegetation" refers to vegetation that is not wanted in a given area, for instance, weed species. Herbicides or herbicidal compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation; specifically, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

130 g ai/ha Z salt*(100 Da Z acid/130 Da Z salt)
=100 g ae/ha Z acid.

As used herein, unless otherwise specified, the term "acyl" may be understood to include a group of formula —C(O)R, where "C(O)" is short-hand notation for C=O. In the acyl group, the R may be alkyl (e.g., $C_1$-$C_6$ alkyl), haloalkyl (e.g., $C_1$-$C_6$ haloalkyl), alkenyl (e.g., $C_2$-$C_6$ alkenyl), haloalkenyl (e.g., $C_2$-$C_6$ haloalkenyl), alkynyl (e.g., $C_2$-$C_6$ alkynyl), aryl or heteroaryl, or arylalkyl (e.g., $C_7$-$C_{10}$ arylalkyl.

As used herein, the term "alkyl" may be understood to include saturated, straight-chained, branched, or cyclic saturated hydrocarbon moieties. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, cyclopropyl, 1-methyl-ethyl, butyl, cyclobutyl, 1-methyl-propyl, 2-methyl-propyl, 1,1-dimethyl-ethyl, pentyl, cyclopentyl, 1-methyl-butyl, 2-methyl-butyl, 3-methyl-butyl, 2,2-dimethyl-propyl, 1-ethyl-propyl, hexyl, cyclohexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "haloalkyl" may be understood to include alkyl groups wherein the hydrogen atoms may partially or entirely be substituted with halogen atoms. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, and 1,1,1-trifluoroprop-2-yl. Haloalkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "alkoxy" may be understood to include a group of the formula R—O—, where R is unsubstituted or substituted alkyl as defined above. Unless otherwise specified, alkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-dimethyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-pentoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "alkoxycarbonyl" may be understood to include a group of the formula —C(O)OR, where R is an unsubstituted or substituted alkyl as defined above. Unless otherwise specified, alkoxycarbonyl groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxycarbonyl, ethoxycarbonyl, propoxycarbonyl, 1-methyl-ethoxycarbonyl, butoxycarbonyl, 1-methyl-propoxycarbonyl, 2-methyl-propoxycarbonyl, 1,1-dimethyl-ethoxycarbonyl, pentoxycarbonyl, 1-methyl-butyloxycarbonyl, 2-methyl-butoxycarbonyl, 3-methyl-butoxycarbonyl, 2,2-dimethyl-propoxycarbonyl, 1-ethyl-propoxycarbonyl, hexoxycarbonyl, 1,1-dimethyl-propoxycarbonyl, 1,2-dimethyl-propoxycarbonyl, 1-methyl-pentoxycarbonyl, 2-methyl-pentoxycarbonyl, 3-methyl-pentoxycarbonyl, 4-methyl-penoxycarbonyl, 1,1-dimethyl-butoxycarbonyl, 1,2-dimethyl-butoxycarbonyl, 1,3-dimethyl-butoxycarbonyl, 2,2-dimethyl-butoxycarbonyl, 2,3-dimethyl-butoxycarbonyl, 3,3-dimethyl-butoxycarbonyl, 1-ethyl-butoxycarbonyl, 2-ethylbutoxycarbonyl, 1,1,2-trimethyl-propoxycarbonyl, 1,2,2-trimethyl-propoxycarbonyl, 1-ethyl-1-methyl-propoxycarbonyl, and 1-ethyl-2-methyl-propoxycarbonyl.

As used herein, the term "haloalkoxy" may be understood to include a group of the formula R—O—, where R is unsubstituted or substituted haloalkyl as defined above. Unless otherwise specified, haloalkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy, and 1,1,1-trifluoroprop-2-oxy.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some aspects, the aryl group can be a phenyl, indanyl or naphthyl group.

As used herein, the term "heteroaryl," as well as derivative terms such as "heteroaryloxy," may be understood to include a 5- or 6-membered aromatic ring containing one or more heteroatoms, for example, N, O or S. Heteroaryl rings may be fused to other aromatic systems. The aryl or heteroaryl substituents may also be substituted with one or more chemical moieties. Examples of suitable substituents include, for example, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied. Preferred substituents include halogen, $C_1$-$C_4$ alkyl and $C_1$-$C_4$ haloalkyl.

As used herein, the term "halogen," including derivative terms such as "halo," refers to fluorine, chlorine, bromine and iodine.

As used herein, agriculturally acceptable salts and esters may be understood to include salts and esters that exhibit herbicidal activity, or that are or can be converted in plants, water, or soil to the referenced herbicide. Exemplary agriculturally acceptable esters are those that are or can be hydrolyzed, oxidized, metabolized, or otherwise converted, e.g., in plants, water, or soil, to the corresponding carboxylic acid which, depending on the pH, may be in the dissociated or undissociated form.

Compounds described herein can include N-oxides. Pyridine N-oxides can be obtained by oxidation of the corresponding pyridines. Suitable oxidation methods are described, for example, in Houben-Weyl, *Methoden der organischen Chemie* [*Methods in organic chemistry*], expanded and subsequent volumes to the 4th edition, volume E 7b, p. 565 f.

II. Pyridine Carboxylate Herbicides

Compositions and methods of the present disclosure include a safened composition comprising (a) a pyridine carboxylate herbicide defined by Formula (I):

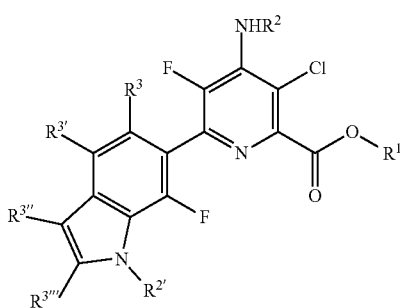

Formula I wherein:
- $R^1$ is cyanomethyl or propargyl;
- $R^2$ and $R^{2'}$ are independently hydrogen, $C_1$-$C_6$ alkyl, formyl, alkoxycarbonyl, or acyl;
- $R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;

or an agriculturally acceptable N-oxide, salt, or ester thereof; and (b) an azole carboxylate safener or an agriculturally acceptable salt or ester thereof.

In some aspects, compositions and methods of the present disclosure include the safened composition comprising (a) the pyridine carboxylate herbicide cyanomethyl 4-amino-3-chloro-5-fluoro-6-(7-fluoro-1H-indol-6-yl)pyridine-2-carboxylate, Compound A:

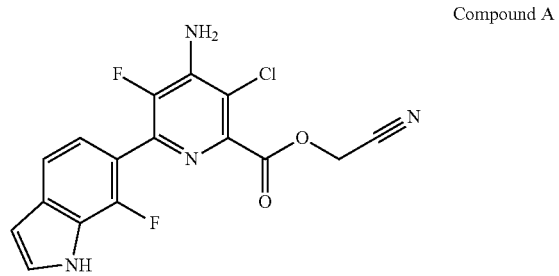 [SMILES: N#CCOC(=O)c1nc(-c2ccc3cc[nH]c3c2F)c(F)c(N)c1Cl]

Compound A or an agriculturally acceptable N-oxide, salt, or ester thereof, and (b) an azole carboxylate safener or an agriculturally acceptable salt or ester thereof.

In some aspects, compositions and methods of the present disclosure include the safened composition comprising (a) the pyridine carboxylate herbicide propargyl 4-amino-3-chloro-5-fluoro-6-(7-fluoro-1H-indol-6-yl)pyridine-2-carboxylate, Compound B:

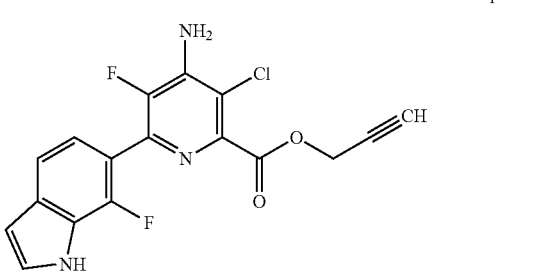

Compound B or an agriculturally acceptable N-oxide, salt, or ester thereof, and (b) an azole carboxylate safener or an agriculturally acceptable salt or ester thereof.

Pyridine carboxylate herbicides defined by Formula (I), as well as methods of making these pyridine carboxylate herbicides, are disclosed in application PCT/US2018/031004, filed May 4, 2018, the entire disclosure of which is hereby expressly incorporated by reference.

In some aspects, the pyridine carboxylate herbicide can be provided as an agriculturally acceptable salt. Exemplary agriculturally acceptable salts of the pyridine carboxylate herbicides include, but are not limited to: sodium salts; potassium salts; ammonium salts or substituted ammonium salts, in particular mono-, di- and tri-$C_1$-$C_8$-alkylammonium salts such as methyl ammonium, dimethylammonium and isopropylammonium; mono-, di- and tri-hydroxy-$C_2$-$C_8$-alkylammonium salts such as hydroxyethylammonium, di(hydroxyethyl)ammonium, tri(hydroxyethyl)ammonium, hydroxypropylammonium, di(hydroxypropyl)ammonium and tri(hydroxypropyl)ammonium salts; olamine salts; diglycolamine salts; choline salts; and quaternary ammonium salts such as those represented by the formula $R^9R^{10}R^{11}R^{12}N^+$ and wherein $R^9$, $R^{10}$, $R^{11}$ and $R^{12}$ (e.g., $R^9$-$R^{12}$) each independently can represent hydrogen, $C_1$-$C_{10}$ alkyl, $C_2$-$C_8$ alkenyl, $C_2$-$C_8$ alkynyl, $C_1$-$C_8$ alkoxy, $C_1$-$C_8$ alkylthio, or aryl groups, provided that $R^9$-$R^{12}$ are sterically compatible.

In some aspects, the pyridine carboxylate herbicide can be provided as an agriculturally acceptable ester. Exemplary agriculturally acceptable esters of the pyridine carboxylate herbicides include, but are not limited to: methyl, ethyl, propyl, 1-methyl-ethyl, butyl, 1-methyl-propyl, 2-methyl-propyl, pentyl, 1-methyl-butyl, 2-methyl-butyl, 3-methyl-butyl, 1-ethyl-propyl, hexyl, 1-methyl-hexyl (mexyl), 2-ethylhexyl, heptyl, 1-methyl-heptyl (meptyl), octyl, isooctyl (isoctyl), butoxyethyl (butotyl), and benzyl.

The pyridine carboxylate herbicide, or an agriculturally acceptable N-oxide, salt, or ester thereof, can be applied to vegetation or an area adjacent the vegetation or applied to soil or water to prevent the emergence or growth of vegetation in an amount sufficient to induce a herbicidal effect. In some aspects, the pyridine carboxylate herbicide, or an agriculturally acceptable N-oxide, salt, or ester thereof, is applied to vegetation or an area adjacent the vegetation or applied to soil or water to prevent the emergence or growth of vegetation in an amount of 0.1 grams acid equivalent per hectare (g ae/ha) or greater, such as 0.2 g ae/ha or greater, 0.3 g ae/ha or greater, 0.4 g ae/ha or greater, 0.5 g ae/ha or greater, 0.6 g ae/ha or greater, 0.7 g ae/ha or greater, 0.8 g ae/ha or greater, 0.9 g ae/ha or greater, 1 g ae/ha or greater, 1.1 g ae/ha or greater, 1.2 g ae/ha or greater, 1.3 g ae/ha or greater, 1.4 g ae/ha or greater, 1.5 g ae/ha or greater, 1.6 g ae/ha or greater, 1.7 g ae/ha or greater, 1.8 g ae/ha or greater, 1.9 g ae/ha or greater, 2 g ae/ha or greater, 2.25 g ae/ha or greater, 2.5 g ae/ha or greater, 2.75 g ae/ha or greater, 3 g ae/ha or greater, 4 g ae/ha or greater, 5 g ae/ha or greater, 6 g ae/ha or greater, 7 g ae/ha or greater, 8 g ae/ha or greater, 9 g ae/ha or greater, 10 g ae/ha or greater, 11 g ae/ha or greater, 12 g ae/ha or greater, 13 g ae/ha or greater, 14 g ae/ha or greater, 15 g ae/ha or greater, 16 g ae/ha or greater, 17 g ae/ha or greater, 18 g ae/ha or greater, 19 g ae/ha or greater, 20 g ae/ha or greater, 22 g ae/ha or greater, 24 g ae/ha or greater, 25 g ae/ha or greater, 26 g ae/ha or greater, 28 g ae/ha or greater, 30 g ae/ha or greater, 32 g ae/ha or greater, 34 g ae/ha or greater, 35 g ae/ha or greater, 36 g ae/ha or greater, 38 g ae/ha or greater, 40 g ae/ha or greater, 42.5 g ae/ha or greater, 45 g ae/ha or greater, 47.5 g ae/ha or greater, 50 g ae/ha or greater, 52.5 g ae/ha or greater, 55 g ae/ha or greater, 57.5 g ae/ha or greater, 60 g ae/ha or greater, 65 g ae/ha or greater, 70 g ae/ha or greater, 75 g ae/ha or greater, 80 g ae/ha or greater, 85 g ae/ha or greater, 90 g ae/ha or greater, 95 g ae/ha or greater, 100 g ae/ha or greater, 110 g ae/ha or greater, 120 g ae/ha or greater, 130 g ae/ha or greater, 140 g ae/ha or greater, 150 g ae/ha or greater, 160 g ae/ha or greater, 170 g ae/ha or greater, 180 g ae/ha or greater, 190 g ae/ha or greater, 200 g ae/ha or greater, 210 g ae/ha or greater, 220 g ae/ha or greater, 230 g ae/ha or greater, 240 g ae/ha or greater, 250 g ae/ha or greater, 260 g ae/ha or greater, 270 g ae/ha or greater, 280 g ae/ha or greater, or 290 g ae/ha or greater; in an amount of 300 g ae/ha or less, such as 290 g ae/ha or less, 280 g ae/ha or less, 270 g ae/ha or less, 260 g ae/ha or less, 250 g ae/ha or less, 240 g ae/ha or less, 230 g ae/ha or less, 220 g ae/ha or less, 210 g ae/ha or less, 200 g ae/ha or less, 190 g ae/ha or less, 180 g ae/ha or less, 170 g ae/ha or less, 160 g ae/ha or less, 150 g ae/ha or less, 140 g ae/ha or less, 130 g ae/ha or less, 120 g ae/ha or less, 110 g ae/ha or less, 100 g ae/ha or less, 95 g ae/ha or less, 90 g ae/ha or less, 85 g ae/ha or less, 80 g ae/ha or less, 75 g ae/ha or less, 70 g ae/ha or less, 65 g ae/ha or less, 60 g ae/ha or less, 57.5 g ae/ha or less, 55 g ae/ha or less, 52.5 g ae/ha or less, 50 g ae/ha or less, 47.5 g ae/ha or less, 45 g ae/ha or less, 42.5 g ae/ha or less, 40 g ae/ha or less, 38 g ae/ha or less, 36 g ae/ha or less, 35 g ae/ha or less, 34 g ae/ha or less, 32 g ae/ha or less, 30 g ae/ha or less, 28 g ae/ha or less, 26 g ae/ha or less, 25 g ae/ha or less, 24 g ae/ha or less, 22 g ae/ha or less, 20 g ae/ha or less, 19 g ae/ha or less, 18 g ae/ha or less, 17 g ae/ha or less, 16 g ae/ha or less, 15 g ae/ha or less, 14 g ae/ha or less, 13 g ae/ha or less, 12 g ae/ha or less, 11 g ae/ha or less, 10 g ae/ha or less, 9 g ae/ha or less, 8 g ae/ha or less, 7 g ae/ha or less, 6 g ae/ha or less, 5 g ae/ha or less, 4 g ae/ha or less, 3 g ae/ha or less, 2.75 g ae/ha or less, 2.5 g ae/ha or less, 2.25 g ae/ha or less, 2 g ae/ha or less, 1.9 g ae/ha or less, 1.8 g ae/ha or less, 1.7 g ae/ha or less, 1.6 g ae/ha or less, 1.5 g ae/ha or less, 1.4 g ae/ha or less, 1.3 g ae/ha or less, 1.2 g ae/ha or less, 1.1 g ae/ha or less, 1 g ae/ha or less, 0.9 g ae/ha or less, 0.8 g ae/ha or less, 0.7 g ae/ha or less, 0.6 g ae/ha or less, 0.5 g ae/ha or less, 0.4 g ae/ha or less, 0.3 g ae/ha or less, or 0.2 g ae/ha or less; or in an amount within any range defined between any pair of the preceding values, such as from 0.1 g ae/ha to 300 g ae/ha, from 1 g ae/ha to 150 g ae/ha, from 10 g ae/ha to 200 g ae/ha, from 25 g ae/ha to 75 g ae/ha, or from 40 g ae/ha to 100 g ae/ha.

III. Azole Carboxylate Safeners

In addition to the pyridine carboxylate herbicide, the compositions and methods of the present disclosure can include an azole carboxylate safener or an agriculturally acceptable salt or ester thereof. Herbicide safeners are molecules used in combination with herbicides to make them "safer"—that is, to reduce the herbicidal effect of the herbicide on crop plants and to improve selectivity between crops and the undesirable vegetation being targeted by the herbicide. Herbicide safeners can be used to pre-treat crop seeds prior to planting. Herbicide safeners may also be sprayed on plants as a mixture with the herbicide, or separately and sequentially with the herbicide.

Azoles are a class of five-membered nitrogen heterocyclic ring compounds containing at least one additional heteroatom (e.g., nitrogen, sulfur, or oxygen) within the heterocyclic ring. Examples of azoles include, for example, pyrazoles, imidazoles, thiazoles, oxazoles, isoxazoles and triazoles.

Azole carboxylate safeners are a class of safeners based on carboxylate-substituted azole moieties. Examples of azole carboxylate safeners include pyrazole carboxylate safeners, imidazole carboxylate safeners, thiazole carboxylate safeners, oxazole carboxylate safeners, isoxazole carboxylate safeners, and triazole carboxylate safeners. In some aspects, the composition can include an azole carboxylate safener selected from the group consisting of fenchlorazole, flurazole, furilazole, isoxadifen, mefenpyr, agriculturally acceptable salts or esters thereof, or combinations thereof. In some aspects, the azole carboxylate safener can include fenchlorazole-ethyl, isoxadifen-ethyl, mefenpyr-diethyl, or combinations thereof.

In some aspects, the azole carboxylate safener can comprise fenchlorazole, shown below, or an agriculturally acceptable salt or ester thereof. Fenchlorazole's safening activity is described in *The Pesticide Manual*, Eighteenth Edition, 2016.

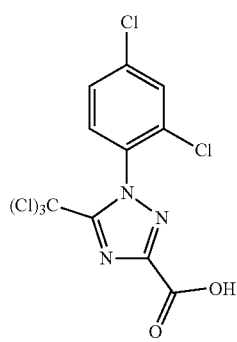

In some aspects, the fenchlorazole is provided as an agriculturally acceptable salt or ester. An exemplary agriculturally acceptable ester of fenchlorazole is fenchlorazole-ethyl, shown below.

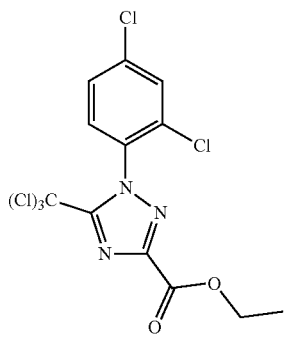

In some aspects, the azole carboxylate safener can comprise flurazole, shown below, or an agriculturally acceptable salt or ester thereof. Flurazole's safening activity is described in *The Pesticide Manual*, Eighteenth Edition, 2016.

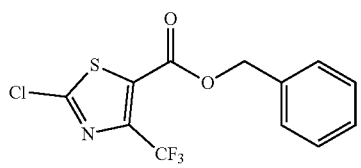 [SMILES: O=C(OCc1ccccc1)c1sc(Cl)nc1C(F)(F)F]

In some aspects, the azole carboxylate safener can comprise furilazole, shown below, or an agriculturally acceptable salt or ester thereof. Furilazole's safening activity is described in *The Pesticide Manual*, Eighteenth Edition, 2016.

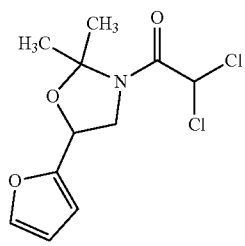 [SMILES: CC1(C)OC(c2ccco2)CN1C(=O)C(Cl)Cl]

In some aspects, the azole carboxylate safener can comprise isoxadifen, shown below, or an agriculturally acceptable salt or ester thereof. Isoxadifen's safening activity is described in *The Pesticide Manual*, Eighteenth Edition, 2016.

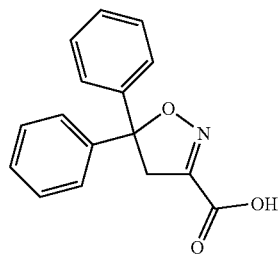 [SMILES: O=C(O)C1=NOC(c2ccccc2)(c2ccccc2)C1]

In some aspects, the isoxadifen is provided as an agriculturally acceptable salt or ester. An exemplary agriculturally acceptable ester of isoxadifen is isoxadifen-ethyl, shown below.

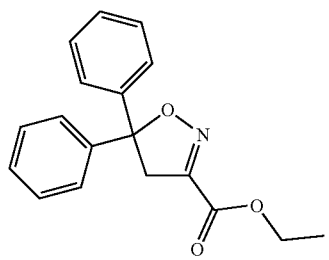 [SMILES: CCOC(=O)C1=NOC(c2ccccc2)(c2ccccc2)C1]

In some aspects, the azole carboxylate safener can comprise mefenpyr, shown below, or an agriculturally acceptable salt or ester thereof. Mefenpyr's safening activity is described in *The Pesticide Manual*, Eighteenth Edition, 2016.

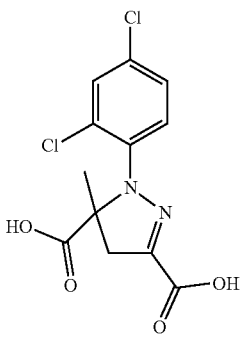 [SMILES: CC1(C(=O)O)CC(C(=O)O)=NN1c1ccc(Cl)cc1Cl]

In some aspects, the mefenpyr is provided as an agriculturally acceptable salt or ester. An exemplary agriculturally acceptable ester of mefenpyr is mefenpyr-diethyl, shown below.

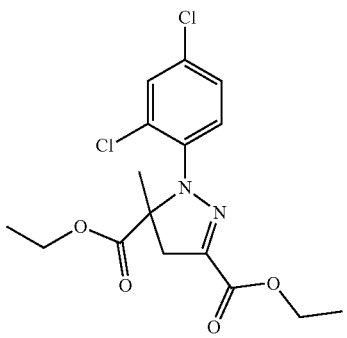 [SMILES: CCOC(=O)C1=NN(c2ccc(Cl)cc2Cl)C(C)(C(=O)OCC)C1]

In some aspects, the azole carboxylate safener can be provided as an agriculturally acceptable ester. Suitable esters include, but are not limited to, methyl, ethyl, isopropyl, butyl, hexyl, heptyl, isoheptyl, mexyl, isooctyl, 2-ethylhexyl and butoxyethyl esters, and aryl esters such as benzyl. Exemplary agriculturally acceptable esters of the azole carboxylate safeners described herein include methyl, ethyl, and diethyl esters.

In some aspects, the azole carboxylate safener can comprise an agriculturally acceptable salt of the azole carboxylate safener. Agriculturally acceptable salts of the azole carboxylate safener include, for example sodium, potassium, ammonium, monoethanolammonium, diethanolammonium, triethanolammonium, monoisopropanolammonium, diisopropanolammonium, triisopropanolammonium, choline, N,N-dimethylethanolammonium, diethylammonium, dimethylammonium, trimethylammonium, triethylammonium, and isopropylammonium salts of the azole carboxylate safener.

An azole carboxylate safener, when applied in combination with herbicides, can be used to reduce phytotoxicity to crops such as wheat, barley, triticale, rye, teff, oats, maize, sorghum, millet, rice, millet, canola/oilseed rape, flax, soy, sunflower, sugar beet, cotton, sugarcane, and pasture grasses.

The azole carboxylate safener or an agriculturally acceptable salt or ester thereof can be used in an amount sufficient to induce a safening effect. In some aspects, the azole carboxylate safener is selected from the group consisting of fenchlorazole, fenclorim, flurazole, furilazole, isoxadifen, mefenpyr, an agriculturally acceptable salt or ester thereof, or combinations thereof, and is applied to vegetation or an area adjacent the vegetation or applied to soil or water in an amount of 1 g active ingredient per hectare (ai/ha) or greater, such as 2 g ai/ha or greater, 3 g ai/ha or greater, 4 g ai/ha or greater, 5 g ai/ha or greater, 6 g ai/ha or greater, 7 g ai/ha or greater, 8 g ai/ha or greater, 9 g ai/ha or greater, 10 g ai/ha or greater, 11 g ai/ha or greater, 12 g ai/ha or greater, 13 g ai/ha or greater, 14 g ai/ha or greater, 15 g ai/ha or greater, 16 g ai/ha or greater, 17 g ai/ha or greater, 18 g ai/ha or greater, 19 g ai/ha or greater, 20 g ai/ha or greater, 22 g ai/ha or greater, 24 g ai/ha or greater, 25 g ai/ha or greater, 26 g ai/ha or greater, 28 g ai/ha or greater, 30 g ai/ha or greater, 32 g ai/ha or greater, 34 g ai/ha or greater, 35 g ai/ha or greater, 36 g ai/ha or greater, 38 g ai/ha or greater, 40 g ai/ha or greater, 42.5 g ai/ha or greater, 45 g ai/ha or greater, 47.5 g ai/ha or greater, 50 g ai/ha or greater, 52.5 g ai/ha or greater, 55 g ai/ha or greater, 57.5 g ai/ha or greater, 60 g ai/ha or greater, 65 g ai/ha or greater, 70 g ai/ha or greater, 75 g ai/ha or greater, 80 g ai/ha or greater, 85 g ai/ha or greater, 90 g ai/ha or greater, 95 g ai/ha or greater, 100 g ai/ha or greater, 110 g ai/ha or greater, 120 g ai/ha or greater, 130 g ai/ha or greater, 140 g ai/ha or greater, 150 g ai/ha or greater, 160 g ai/ha or greater, 170 g ai/ha or greater, 180 g ai/ha or greater, 190 g ai/ha or greater, 200 g ai/ha or greater, 210 g ai/ha or greater, 220 g ai/ha or greater, 230 g ai/ha or greater, 240 g ai/ha or greater, 250 g ai/ha or greater, 260 g ai/ha or greater, 270 g ai/ha or greater, 280 g ai/ha or greater, or 290 g ai/ha or greater; in an amount of 300 g ai/ha or less, such as 290 g ai/ha or less, 280 g ai/ha or less, 270 g ai/ha or less, 260 g a/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 57.5 g ai/ha or less, 55 g ai/ha or less, 52.5 g ai/ha or less, 50 g ai/ha or less, 47.5 g ai/ha or less, 45 g ai/ha or less, 42.5 g ai/ha or less, 40 g ai/ha or less, 38 g ai/ha or less, 36 g ai/ha or less, 35 g ai/ha or less, 34 g ai/ha or less, 32 g ai/ha or less, 30 g ai/ha or less, 28 g ai/ha or less, 26 g ai/ha or less, 25 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3 g ai/ha or less, or 2 g ai/ha or less; or in an amount within any range defined between any pair of the preceding values, such as from 1 g ai/ha to 300 g ai/ha, from 5 g ai/ha to 150 g ai/ha, from 10 g ai/ha to 200 g ai/ha, from 20 g ai/ha to 75 g ai/ha, or from 40 g ai/ha to 100 g ai/ha.

IV. Safened Compositions

A safened composition comprising (a) a pyridine carboxylate herbicide or an agriculturally acceptable N-oxide, salt, or ester thereof may be mixed with or applied in combination with (b) an azole carboxylate safener or an agriculturally acceptable salt or ester thereof.

In some aspects, (a) and (b) are used in an amount sufficient to induce an unexpectedly enhanced herbicidal effect (e.g., increased damage or injury to undesirable vegetation) while still showing good crop compatibility (e.g., no increased damage to crops or minimal increased damage or injury to crops) when compared to the individual application of the herbicidal compounds (a) or (b). In some aspects, the damage or injury to undesirable vegetation caused by the safened compositions and methods disclosed herein is evaluated using a scale from 0% to 100%, when compared with the untreated control vegetation, wherein 0% indicates no damage to the undesirable vegetation and 100% indicates complete destruction of the undesirable vegetation. Similarly, in some aspects, the damage or injury to the crop caused by the safened compositions and methods disclosed herein is evaluated using a scale from 0% to 100%, when compared with control crops treated with only the herbicide or the safener, wherein 0% indicates no damage to the crop and 100% indicates complete destruction of the crop.

In some aspects, the joint action of (a) the pyridine carboxylate herbicide or an agriculturally acceptable N-oxide, salt, or ester thereof and (b) the azole carboxylate safener or an agriculturally acceptable salt or ester thereof results in unexpectedly enhanced herbicidal effect against undesirable vegetation, even at application rates below those typically used for the herbicide to have a herbicidal effect on its own. In some aspects, the compositions and methods disclosed herein can, based on the individual components, be used at lower application rates to achieve a herbicidal effect comparable to the effect produced by the individual components at normal application rates. In some aspects, the joint action of (a) the pyridine carboxylate herbicide or an agriculturally acceptable N-oxide, salt, or ester thereof and (b) the azole carboxylate safener or an agriculturally acceptable salt or ester thereof results in an unexpected protective effect for desired crops against damage to the crops that might be caused by the herbicide alone.

In some aspects, the weight ratio of (a) the pyridine carboxylate herbicide or an agriculturally acceptable N-oxide, salt, or ester thereof (in g ae/ha) to (b) the azole carboxylate safener or an agriculturally acceptable salt or ester thereof (in g ai/ha) can be 1:5 or more, such as 1:4.75 or more, 1:4.5 or more, 1:4.25 or more, 1:4 or more, 1:3.75 or more, 1:3.5 or more, 1:3.25 or more, 1:3 or more, 1:2.75 or more, 1:2.5 or more, 1:2.25 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 2.25:1 or more, 2.5:1 or more, 2.75:1 or more, 3:1 or more, 3.25:1 or more, 3.5:1 or more, 3.75:1 or more, 4:1 or more, 4.25:1 or more, 4.5:1 or more, 4.75:1 or more, or 5:1 or more; the weight ratio of (a) to (b) can be 5:1 or less, such as 4.75:1 or less, 4.5:1 or less, 4.25:1 or less, 4:1 or less, 3.75:1 or less, 3.5:1 or less, 3.25:1 or less, 3:1 or less, 2.75:1 or less, 2.5:1 or less, 2.25:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:2.25 or less, 1:2.5 or less, 1:2.75 or less, 1:3 or less, 1:3.25 or less, 1:3.5 or less, 1:3.75 or less, 1:4 or less, 1:4.25 or less, 1:4.5 or less, or 1:4.75 or less; or the weight ratio of (a) to (b) can range from any of the minimum ratios to any of the maximum ratios provided above, such as from 1:5 to 5:1, from 1:2 to 5:1, from 1:1 to 3:1, from 1:3 to 4:1, or from 1:1.5 to 3.5:1.

In some aspects, (a) and (b), independently, can be employed in a purity of from 90% to 100% (e.g., from 95% to 100%) according to nuclear magnetic resonance (NMR) spectroscopy.

V. Formulations

The present disclosure also includes formulations of the compositions and methods disclosed herein.

A. Additives

The compositions and methods disclosed herein can also be mixed with or applied with an additive. In some aspects, the additive is added sequentially. In some aspects, the additive is added simultaneously. In some aspects, the additive is premixed with the pyridine carboxylate herbicide or agriculturally acceptable N-oxide, salt, or ester thereof. In some aspects, the additive is premixed with the azole carboxylate safener or agriculturally acceptable salt or ester thereof.

1. Other Pesticides

Some aspects of the disclosed safened compositions disclosed include adding one or more additional pesticide active ingredients to the safened compositions. These pesticide active ingredients may include one or more of an herbicide, an insecticide, a fungicide, a nematocide, a miticide, a arthropodicide, a bactericide, a plant growth regulator, or combinations thereof that are compatible with the compositions of the present disclosure.

In some aspects, the additive is an additional herbicide. For example, the compositions described herein can be applied in conjunction with one or more additional herbicides to control undesirable vegetation. The composition can be formulated with the one or more additional herbicides, tank mixed with the one or more additional herbicides, or applied sequentially with the one or more additional herbicides. Exemplary additional herbicides include, but are not limited to: 4-CPA; 4-CPB; 4-CPP; 2;4-D; 2;4-D choline salt; 2,4-D salts, esters and amines; 2,4-DB; 3,4-DA; 3,4-DB; 2,4-DEB; 2,4-DEP; 2,4-DP; 3,4-DP; 2,3,6-TBA; 2,4,5-T; 2,4,5-TB; acetochlor; acifluorfen; aclonifen; acrolein; alachlor; allidochlor; alloxydim; allyl alcohol; alorac; ametridione; ametryne; amibuzin; amicarbazone; amidosulfuron; aminocyclopyrachlor; 4-aminopicolinic acid based herbicides, such as halauxifen, halauxifen-methyl, florpyrauxifen, and those described in U.S. Pat. Nos. 7,314,849 and 7,432,227 to Balko, et al.; aminopyralid; amiprofos-methyl; amitrole; ammonium sulfamate; anilofos; anisuron; asulam; atraton; atrazine; azafenidin; azimsulfuron; aziprotryne; barban; BCPC; beflubutamid; benazolin; bencarbazone; benfluralin; benfuresate; bensulide; bensulfuron; benthiocarb; bentazone; benzadox; benzfendizone; benzipram; benzobicyclon; benzofenap; benzofluor; benzoylprop; benzthiazuron; bialaphos; bicyclopyrone; bifenox; bilanafos; bispyribac; borax; bromacil; bromobonil; bromobutide; bromofenoxim; bromoxynil; brompyrazon; butachlor; butafenacil; butamifos; butenachlor; buthidazole; buthiuron; butralin; butroxydim; buturon; butylate; cacodylic acid; cafenstrole; calcium chlorate; calcium cyanamide; cambendichlor; carbasulam; carbetamide; carboxazole; chlorprocarb; carfentrazone-ethyl; CDEA; CEPC; chlomethoxyfen; chloramben; chloranocryl; chlorazifop; chlorazine; chlorobromuron; chlorbufam; chloreturon; chlorfenac; chlorfenprop; chlorflurazole; chlorflurenol; chloridazon; chlorimuron; chlornitrofen; chloropon; chlorotoluron; chloroxuron; chloroxynil; chlorpropham; chlorsulfuron; chlorthal; chlorthiamid; cinidon-ethyl; cinmethylin; cinosulfuron; cisanilide; clacyfos; clethodim; cliodinate; clodinafop-propargyl; clofop; clomazone; clomeprop; cloprop; cloproxydim; clopyralid; cloransulam-methyl; CMA; copper sulfate; CPMF; CPPC; credazine; cresol; cumyluron; cyanatryn; cyanazine; cycloate; cyclopyrimorate; cyclosulfamuron; cycloxydim; cycluron; cyhalofop-butyl; cyperquat; cyprazine; cyprazole; cypromid; daimuron; dalapon; dazomet; delachlor; desmedipham; desmetryn; di-allate; dicamba; dichlobenil; dichloralurea; dichlormate; dichlorprop; dichlorprop-P; diclofop-methyl; diclosulam; diethamquat; diethatyl; difenopenten; difenoxuron; difenzoquat; diflufenican; diflufenzopyr; dimefuron; dimepiperate; dimethachlor; dimethametryn; dimethenamid; dimethenamid-P; dimexano; dimidazon; dinitramine; dinofenate; dinoprop; dinosam; dinoseb; dinoterb; diphenamid; dipropetryn; diquat; disul; dithiopyr; diuron; DMPA; DNOC; DSMA; EBEP; eglinazine; endothal; epronaz; EPTC; erbon; esprocarb; ethalfluralin; ethametsulfuron; ethbenzamide; ethametsulfuron; ethidimuron; ethiolate; ethobenzamid; ethofumesate; ethoxyfen; ethoxysulfuron; etinofen; etnipromid; etobenzanid; EXD; fenasulam; fenoprop; fenoxaprop; fenoxaprop-P-ethyl; fenoxaprop-P-ethyl+isoxadifen-ethyl; fenoxasulfone; fenquinotrione; fenteracol; fenthiaprop; fentrazamide; fenuron; ferrous sulfate; flamprop; flamprop-M; flazasulfuron; florasulam; fluazifop; fluazifop-P-butyl; fluazolate; flucarbazone; flucetosulfuron; fluchloralin; flufenacet; flufenican; flufenpyr-ethyl; flumetsulam;

flumezin; flumiclorac-pentyl; flumioxazin; flumipropyn; fluometuron; fluorodifen; fluoroglycofen; fluoromidine; fluoronitrofen; fluothiuron; flupoxam; flupropacil; flupropanate; flupyrsulfuron; flurochloridone; fluroxypyr; fluroxypyr-meptyl; flurtamone; fluthiacet; fomesafen; foramsulfuron; fosamine; fumiclorac; furyloxyfen; glufosinate; glufosinate-ammonium; glufosinate-P-ammonium; glyphosate salts and esters; halosafen; halosulfuron; haloxydine; haloxyfop; hexachloroacetone; hexaflurate; hexazinone; imazamethabenz; imazamox; imazapic; imazapyr; imazaquin; imazethapyr; imazosulfuron; indanofan; indaziflam; iodobonil; iodomethane; iodosulfuron; iodosulfuron-ethyl-sodium; iofensulfuron; ioxynil; ipazine; ipfencarbazone; iprymidam; isocarbamid; isocil; isomethiozin; isonoruron; isopolinate; isopropalin; isoproturon; isouron; isoxaben; isoxachlortole; isoxaflutole; isoxapyrifop; karbutilate; ketospiradox; lactofen; lenacil; linuron; MAA; MAMA; MCPA esters and amines; MCPA-thioethyl; MCPB; mecoprop; mecoprop-P; medinoterb; mefenacet; mefluidide; mesoprazine; mesosulfuron; mesotrione; metam; metamifop; metamitron; metazachlor; metflurazon; methabenzthiazuron; methalpropalin; methazole; methiobencarb; methiozolin; methiuron; methometon; methoprotryne; methyl bromide; methyl isothiocyanate; methyldymron; metobenzuron; metobromuron; metolachlor; metosulam; metoxuron; metribuzin; metsulfuron; molinate; monalide; monisouron; monochloroacetic acid; monolinuron; monuron; morfamquat; MSMA; naproanilide; napropamide; napropamide-M; naptalam; neburon; nicosulfuron; nipyraclofen; nitralin; nitrofen; nitrofluorfen; norflurazon; noruron; OCH; orbencarb; ortho-dichlorobenzene; orthosulfamuron; oryzalin; oxadiargyl; oxadiazon; oxapyrazon; oxasulfuron; oxaziclomefone; oxyfluorfen; paraflufen-ethyl; parafluron; paraquat; pebulate; pelargonic acid; pendimethalin; penoxsulam; pentachlorophenol; pentanochlor; pentoxazone; perfluidone; pethoxamid; phenisopham; phenmedipham; phenmedipham-ethyl; phenobenzuron; phenylmercury acetate; picloram; picolinafen; pinoxaden; piperophos; potassium arsenite; potassium azide; potassium cyanate; pretilachlor; primisulfuron; procyazine; prodiamine; profluazol; profluralin; profoxydim; proglinazine; prohexadione-calcium; prometon; prometryne; pronamide; propachlor; propanil; propaquizafop; propazine; propham; propisochlor; propoxycarbazone; propyrisulfuron; propyzamide; prosulfalin; prosulfocarb; prosulfuron; proxan; prynachlor; pydanon; pyraclonil; pyraflufen; pyrasulfotole; pyrazogyl; pyrazone; pyrazolynate; pyrazosulfuron; pyrazoxyfen; pyribenzoxim; pyributicarb; pyriclor; pyridafol; pyridate; pyriftalid; pyriminobac; pyrimisulfan; pyrithiobac-sodium; pyroxasulfone; pyroxsulam; quinclorac; quinmerac; quinoclamine; quinonamid; quizalofop; quizalofop-P-ethyl; quizalofop-P-tefuryl; rhodethanil; rimsulfuron; saflufenacil; S-metolachlor; sebuthylazine; secbumeton; sethoxydim; siduron; simazine; simeton; simetryn; SMA; sodium arsenite; sodium azide; sodium chlorate; sulcotrione; sulfallate; sulfentrazone; sulfometuron; sulfosate; sulfosulfuron; sulfuric acid; sulglycapin; swep; TCA; tebutam; tebuthiuron; tefuryltrione; tembotrione; tepraloxydim; terbacil; terbucarb; terbuchlor; terbumeton; terbuthylazine; terbutryne; tetrafluron; thenylchlor; thiameturon; thiazafluron; thiazopyr; thidiazimin; thidiazuron; thiencarbazone; thifensulfuron; thiobencarb; tiafenacil; tiocarbazil; tioclorim; tolpyralate; topramezone; tralkoxydim; tri-allate; triafamone; triasulfuron; triaziflam; tribenuron; tribenuron; tricamba; triclopyr choline salt; triclopyr esters and amines; tridiphane; trietazine; trifloxysulfuron; trifludimoxazin; trifluralin; triflusulfuron; trifop; trifopsime; trihydroxytriazine; trimeturon; tripropindan; tritac; tritosulfuron; vemolate; xylachlor; and salts, esters, optically active isomers, and mixtures thereof.

In some aspects, the additional pesticide or an agriculturally acceptable salt or ester thereof is provided in a premixed formulation with (a), (b), or combinations thereof. In some aspects, the pyridine carboxylate herbicide or an agriculturally acceptable N-oxide, salt, or ester thereof is provided in a premixed formulation with an additional pesticide. In some aspects, the azole carboxylate safener or an agriculturally acceptable salt or ester thereof is provided in a premixed formulation with an additional pesticide.

In some aspects, the safened compositions may include one or more herbicidal active ingredients in addition to (a). In some aspects, the safened compositions do not include an herbicidal active ingredient in addition to (a). In some aspects, the safened compositions may exclude one or more herbicidal active ingredients specified above. In some aspects, the safened compositions may include one or more herbicidal active ingredients in addition to (a), but may exclude one or more herbicidal ingredients specified above. In some aspects, the safened compositions may include one or more safeners in addition to (b). In some aspects, the safened compositions do not include a safener in addition to (b). In some aspects, the composition may include other components, such as adjuvants, but does not include a herbicidal active ingredient in addition to (a) or a safener in addition to (b).

2. Adjuvants

In some aspects, the additive includes an agriculturally acceptable adjuvant. Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, adhesives (for instance, for use in seed formulations), surfactants, protective colloids, emulsifiers, tackifiers, and mixtures thereof.

Exemplary agriculturally acceptable adjuvants include, but are not limited to, crop oil concentrates (e.g., 85% mineral oil+15% emulsifiers); nonylphenol ethoxylates; benzylcocoalkyldimethyl quaternary ammonium salts; blends of petroleum hydrocarbon, alkyl esters, organic acids, and anionic surfactants; $C_9$-$C_{11}$ alkylpolyglycoside; phosphate alcohol ethoxylates; natural primary alcohol ($C_{12}$-$C_{16}$) ethoxylate; di-sec-butylphenol EO-PO block copolymers; polysiloxane-methyl cap; nonylphenol ethoxylate+urea ammonium nitrates; emulsified methylated seed oils; tridecyl alcohol (synthetic) ethoxylates (e.g., 8 EO); tallow amine ethoxylates (e.g., 15 EO); and PEG(400) dioleate-99.

Exemplary surfactants (e.g., wetting agents, tackifiers, dispersants, emulsifiers) include, but are not limited to: the alkali metal salts, alkaline earth metal salts and ammonium salts of fatty acids or of aromatic sulfonic acids (e.g., lignosulfonic acids, phenolsulfonic acids, naphthalenesulfonic acids, and dibutylnaphthalenesulfonic acid); alkyl- and alkylarylsulfonates; alkyl sulfates, lauryl ether sulfates and fatty alcohol sulfates; salts of sulfated hexa-, hepta- and octadecanols; salts of fatty alcohol glycol ethers; condensates of sulfonated naphthalene and its derivatives with formaldehyde; condensates of naphthalene or of the naphthalene sulfonic acids with phenol and formaldehyde; polyoxyethylene octylphenol ether; ethoxylated isooctyl-, octyl- or nonylphenol, alkylphenyl or tributylphenyl polyglycol ether; alkyl aryl polyether alcohols; isotridecyl alcohol; fatty alcohol/ethylene oxide condensates; ethoxylated castor oil; polyoxyethylene alkyl ethers or polyoxypropylene alkyl ethers; lauryl alcohol polyglycol ether acetate; sorbitol esters; lignosulfite waste liquors and proteins; denatured proteins, polysaccharides (e.g., methylcellulose); hydrophobically modified starches; and polyvinyl alcohol, polycarboxylates, polyalkoxylates, polyvinyl amine, polyethyleneimine, polyvinylpyrrolidone, and copolymers thereof.

Exemplary thickeners include, but are not limited to, polysaccharides (e.g., xanthan gum), organic and inorganic sheet minerals, and mixtures thereof.

Exemplary antifoam agents include, but are not limited to, silicone emulsions, long-chain alcohols, fatty acids, fatty acid salts, organofluorine compounds, and mixtures thereof.

Exemplary antimicrobial agents include, but are not limited to: bactericides based on dichlorophen and benzyl alcohol hemiformal; isothiazolinone derivatives, such as alkylisothiazolinones and benzisothiazolinones; and mixtures thereof.

Exemplary antifreeze agents, include, but are not limited to ethylene glycol, propylene glycol, urea, glycerol, and mixtures thereof.

Exemplary colorants include, but are not limited to, the dyes known under the names Rhodamine B, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108, and mixtures thereof.

Exemplary adhesives include, but are not limited to, polyvinylpyrrolidone, polyvinyl acetate, polyvinyl alcohol, tylose, and mixtures thereof.

3. Carriers

In some aspects, the additive includes a carrier. In some aspects, the additive includes a liquid or solid carrier. In some aspects, the additive includes an organic or inorganic carrier. Exemplary liquid carriers include, but are not limited to: water; petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like; toluene; xylene; petroleum naphtha; crop oil; acetone; methyl ethyl ketone; cyclohexanone; trichloroethylene; perchloroethylene; ethyl acetate; amyl acetate; butyl acetate; propylene glycol monomethyl ether and diethylene glycol monomethyl ether; methyl alcohol; ethyl alcohol; isopropyl alcohol; amyl alcohol; ethylene glycol; propylene glycol; glycerin; N-methyl-2-pyrrolidinone; N;N-dimethyl alkylamides; dimethyl sulfoxide; and liquid fertilizers, as well as mixtures thereof. Exemplary solid carriers include, but are not limited to: silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

B. Physical States

In some aspects, the formulation of (a) the pyridine carboxylate herbicide or an agriculturally acceptable N-oxide, salt, or ester thereof and (b) the azole carboxylate safener or an agriculturally acceptable salt or ester thereof may be present in suspended, emulsified, dissolved, or solid form. Exemplary formulations include, but are not limited to, aqueous solutions, aqueous suspensions, aqueous dispersions, aqueous emulsions, aqueous microemulsions, aqueous suspo-emulsions, oil solutions, oil suspensions, oil dispersions, oil emulsions, oil microemulsions, oil suspo-emulsions, self-emulsifying formulations, pastes, powders, dusts, granules, and materials for spreading.

In some aspects, (a) the pyridine carboxylate herbicide or an agriculturally acceptable N-oxide, salt, or ester thereof or (b) the azole carboxylate safener or an agriculturally acceptable salt or ester thereof are aqueous solutions that can be diluted before use. In various aspects, (a) or (b) are provided as a high-strength formulation such as a concentrate. In some aspects, the concentrate is stable and retains potency during storage and shipping. In various aspects, the concentrate is a clear, homogeneous liquid that is stable at temperatures of 54° C. or greater. In some aspects, the concentrate does not exhibit any precipitation of solids at temperatures of −10° C. or higher. In some aspects, the concentrate does not exhibit separation, precipitation, or crystallization of any components at low temperatures. For example, the concentrate remains a clear solution at temperatures below 0° C. (e.g., below −5° C., below −10° C., below −15° C.). In some aspects, the concentrate exhibits a viscosity of less than 50 centipoise (50 megapascals), even at temperatures as low as 5° C. In some aspects, the concentrate does not exhibit separation, precipitation, or crystallization of any components during storage for a period of 2 weeks or greater (e.g., 4 weeks, 6 weeks, 8 weeks, 3 months, 6 months, 9 months, or 12 months or greater).

In some aspects, emulsions, pastes, or oil dispersions can be prepared by homogenizing (a) and (b) in water with a wetting agent, tackifier, dispersant, or emulsifier. In some aspects, concentrates suitable for dilution with water can be prepared, comprising (a), (b), a wetting agent, a tackifier, and a dispersant or emulsifier.

In some aspects, powders, materials for spreading, or dusts can be prepared by mixing or concomitant grinding of (a) and (b) and optionally other additives with a solid carrier.

In some aspects, granules (e.g., coated granules, impregnated granules and homogeneous granules) can be prepared by binding the (a) and (b) to solid carriers.

In some aspects, the formulations comprise from 1% to 99% of (a) and 1% to 99% of (b) (e.g., 95% of (a) and 5% of (b); 70% of (a) and 30% of (b); or 30% of (a) and 70% of (b)) by total weight of (a) and (b). In formulations designed to be employed as concentrates, the total amount of (a) and (b) can be present in a concentration of from about 0.1 to about 98 weight percent (wt. %), based on the total weight of the formulation. For example, the total amount of (a) and (b) can be present in a concentration as little as about 1 wt. %, about 2.5 wt. %, about 5 wt. %, about 7.5 wt. %, about 10 wt. %, about 15 wt. %, about 20 wt. %, about 25 wt. %, about 30 wt. %, about 35 wt. %, about 40 wt. %, about 45 wt. %, as high as about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 97 wt. %, or within any range defined between any two of the forgoing values, such as between about 1 wt. % to about 97 wt. %, between about 10 wt. % to about 90 wt. %, between about 20 wt. % to about 45 wt. %, and about 25 wt. % to about 50 wt. % based on the total weight of the formulation. Concentrates can be diluted with an inert carrier, such as water, prior to application. The diluted formulations applied to undesirable vegetation or the locus of undesirable vegetation can contain from 0.0006 to 8.0 wt. % of the total amount of (a) and (b) (e.g., from 0.001 to 5.0 wt. %), based on the total weight of the diluted formulation.

C. Packaging

In some aspects, the formulation can be in the form of a single package formulation including both: (a) the pyridine carboxylate herbicide or an agriculturally acceptable N-oxide, salt, or ester thereof; and (b) the azole carboxylate safener or an agriculturally acceptable salt or ester thereof. In some aspects, the formulation can be in the form of a single package formulation including both (a) and (b) and further including at least one additive. In some aspects, the formulation can be in the form of a multi-package formulation, such as a two-package formulation, wherein one package contains (a) and optionally at least one additive while the other package contains (b) and optionally at least one additive. In some aspects of the two-package formulation, the formulation including (a) and optionally at least one additive and the formulation including (b) and optionally at least one additive are mixed before application and then applied simultaneously. In some aspects, the mixing is performed as a tank mix (e.g., the formulations are mixed immediately before or upon dilution with water). In some aspects, the formulation including (a) and the formulation including (b) are not mixed but are applied sequentially (in succession), for example, immediately or within 1 hour, within 2 hours, within 4 hours, within 8 hours, within 16 hours, within 24 hours, within 2 days, or within 3 days, of each other.

VI. Methods of Use

The compositions disclosed herein can be applied in any known technique for applying herbicides. Exemplary application techniques include, but are not limited to, spraying, atomizing, dusting, spreading, or direct application into water. The method of application can vary depending on the intended purpose. In some aspects, the method of application can be chosen to ensure the finest possible distribution of the compositions disclosed herein.

In some aspects, a method of controlling undesirable vegetation which comprises contacting the vegetation or the locus thereof with or applying to the soil or water to prevent the emergence or growth of vegetation any of the compositions is disclosed herein.

The compositions disclosed herein can be applied pre-emergence (before the emergence of undesirable vegetation) or post-emergence (e.g., during and/or after emergence of the undesirable vegetation). In some aspects, the composition is applied post-emergence to the undesirable vegetation. In some aspects, the pyridine carboxylate herbicide and azole carboxylate safener are applied simultaneously. In some aspects, the pyridine carboxylate herbicide and azole carboxylate safener are applied sequentially, for example, immediately or with minimal delay, within about 10 minutes, within about 20 minutes, within about 30 minutes, within about 40 minutes, within about 1 hour, within about 2 hours, within about 4 hours, within about 8 hours, within about 16 hours, within about 24 hours, within about 2 days, or within about 3 days, of each other.

In some aspects, the pyridine carboxylate herbicide can be applied pre-emergently or post-emergently to the undesirable vegetation and the azole carboxylate safener can be applied as a seed treatment to the crop seeds. When applied as a seed treatment, the azole carboxylate safener is applied at rate from 0.01 to 10 g ai of safener per kg (g ai/kg) of crop seed, preferably 0.05 to 1 g ai/kg of crop seed, in particular 0.1 to 0.5 g ai/kg of crop seed. If solutions of safeners are used to treat the seeds, the concentration of the safener in the solution is, for example, from 1 to 10000 ppm, preferably 100 to 1000 ppm, based on weight.

When the compositions are used in crops, the compositions can be applied after seeding and before or after the emergence of the crop plants. In some aspects, the compositions disclosed herein show good crop tolerance even when the crop has already emerged and can be applied during or after the emergence of the crop plants. In some aspects, when the compositions are used in crops, the compositions can be applied before seeding of the crop plants.

In some aspects, the compositions disclosed herein are applied to vegetation or an area adjacent the vegetation or applying to soil or water to prevent the emergence or growth of vegetation by spraying (e.g., foliar spraying). In some aspects, the spraying techniques use, for example, water as carrier and spray volume rates of from 2 liters per hectare (L/ha) to 2000 L/ha (e.g., from 10-1000 L/ha or from 50-500 L/ha). In some aspects, the compositions disclosed herein are applied by the low-volume or the ultra-low-volume method, wherein the application is in the form of micro granules. In some aspects, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or on the bare soil (e.g., post-directed or lay-by). In some aspects, the compositions disclosed herein can be applied as dry formulations (e.g., granules, powders, or dusts).

In some aspects, wherein the undesirable vegetation is treated post-emergence, the compositions disclosed herein are applied by foliar application. In some aspects, herbicidal activity is exhibited by the compounds of the mixture when they are applied directly to the plant or to the locus of the plant at any stage of growth or before planting or emergence. The effect observed can depend upon the type of undesirable vegetation to be controlled, the stage of growth of the undesirable vegetation, the application parameters of dilution and spray drop size, the particle size of solid components, the environmental conditions at the time of use, the specific compound employed, the specific adjuvants and carriers employed, the soil type, and the like, as well as the amount of chemical applied. In some aspects, these and other factors can be adjusted to promote non-selective or selective herbicidal action.

The compositions and methods disclosed herein can be used to control undesirable vegetation in a variety of applications. The compositions and methods disclosed herein can be used for controlling undesirable vegetation in areas including, but not limited to, farmland, turfgrass, pastures, grasslands, rangelands, fallow land, rights-of-way, aquatic settings, tree and vine, wildlife management areas, or range-land. In some aspects, the undesirable vegetation is controlled in a row crop. Exemplary crops include, but are not limited to, wheat, barley, triticale, rye, teff, oats, maize, cotton, soy, sorghum, rice, millet, sugarcane and range land (e.g., pasture grasses). In some aspects, the compositions and methods disclosed herein can be used for controlling undesirable vegetation in maize, wheat, barley, rice, sorghum, millet, or oats, or combinations thereof. In some aspects, the compositions and methods disclosed herein can be used for controlling undesirable vegetation in broadleaf crops. In some aspects, the compositions and methods disclosed herein can be used for controlling undesirable vegetation in canola, flax, sunflower, soy, or cotton. In some aspects, the compositions and methods disclosed herein can be used in industrial vegetation management (IVM) or for utility, pipeline, roadside, and railroad rights-of-way applications. In some aspects, the compositions and methods disclosed herein can also be used in forestry (e.g., for site preparation or for combating undesirable vegetation in plantation forests). In some aspects, the compositions and methods disclosed herein can be used to control undesirable vegetation in conservation reserve program lands (CRP), trees, vines, grasslands, and grasses grown for seeds. In some aspects, the compositions and methods disclosed herein can be used on lawns (e.g., residential, industrial, and institutional), golf courses, parks, cemeteries, athletic fields, and sod farms.

The compositions and methods disclosed herein can also be used in crop plants that are resistant to, for instance, herbicides, pathogens, and/or insects. In some aspects, the compositions and methods disclosed herein can be used in crop plants that are resistant to one or more herbicides because of genetic engineering or breeding. In some aspects, the compositions and methods disclosed herein can be used in crop plants that are resistant to one or more pathogens such as plant pathogenic fungi owing to genetic engineering or breeding. In some aspects, the compositions and methods disclosed herein can be used in crop plants that are resistant to attack by insects owing to genetic engineering or breeding. Exemplary resistant crops include, but are not limited to, crops that are resistant to photosystem II inhibitors, or crop plants that, owing to introduction of the gene for *Bacillus thuringiensis* (or Bt) toxin by genetic modification, are resistant to attack by certain insects. In some aspects, the compositions and methods described herein can be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil to control vegetation in crops tolerant to glyphosate, glufosinate, dicamba, phenoxy auxins, pyridyloxy auxins, aryloxyphenoxypropionates, ACCase inhibitors, imidazolinones, ALS inhibitors, HPPD inhibitors, PPO inhibitors, triazines, bromoxynil, or combinations thereof. In some aspects, the undesirable vegetation is controlled in glyphosate, glufosinate, dicamba, phenoxy auxins, pyridyloxy auxins, aryloxyphenoxypropionates, ACCase inhibitors, ALS inhibitors, HPPD inhibitors, PPO inhibitors, triazines, and bromoxynil tolerant crops possessing single, multiple or stacked traits conferring tolerance to single or multiple chemistries and/or multiple modes of action. In some aspects, the undesirable vegetation can be controlled in a crop that is ACCase-tolerant, ALS-tolerant, or a combination thereof. The combination of (a) and (b) can be used in combination with one or more herbicides that are selective for the crop being treated and which complement the spectrum of weeds controlled by these compounds at the application rate employed. In some aspects, the compositions described herein and other complementary herbicides are applied at the same time, either as a combination formulation or as a tank mix, or as sequential applications. The compositions and methods may be used in controlling undesirable vegetation in crops possessing agronomic stress tolerance (including but not limited to drought, cold, heat, salt, water, nutrient, fertility, pH), pest tolerance (including but not limited to insects, fungi and pathogens), and crop improvement traits (including but not limited to yield; protein, carbohydrate, or oil content; protein, carbohydrate, or oil composition; plant stature and plant architecture).

In some aspects, the compositions disclosed herein can be used for controlling undesirable vegetation including grasses, broadleaf weeds, sedge weeds, and combinations thereof. In some aspects, the compositions disclosed herein can be used for controlling undesirable vegetation including, but not limited to, *Polygonum* species, *Amaranthus* species, *Chenopodium* species, *Sida* species, *Ambrosia* species, *Cyperus* species, *Setaria* species, *Sorghum* species, *Acanthospermum* species, *Anthemis* species, *Atriplex* species, *Brassica* species, *Cirsium* species, *Convolvulus* species, *Conyza* species, *Cassia* species, *Commelina* species, *Datura* species, *Euphorbia* species, *Geranium* species, *Galinsoga* species, *Ipomea* species, *Lamium* species, *Lolium* species, *Malva* species, *Matricaria* species, *Prosopis* species, *Rumex* species, *Sisymbrium* species, *Solanum* species, *Trifolium* species, *Xanthium* species, *Veronica* species, and *Viola* species. In some aspects, the undesired vegetation includes common chickweed (*Stellaria media*), velvetleaf (*Abutilon theophrasti*), hemp sesbania (*Sesbania exaltata* Cory), *Anoda cristata, Bidens pilosa, Brassica kaber*, shepherd's purse (*Capsella bursa-pastoris*), cornflower (*Centaurea cyanus* or *Cyanus segetum*), hempnettle (*Galeopsis tetrahit*), cleavers (*Galium aparine*), common sunflower (*Helianthus annuus*), *Desmodium tortuosum*, Italian ryegrass (*Lolium multiflorum*), kochia (*Kochia scoparia*), *Medicago arabica, Mercurialis annua, Myosotis arvensis*, common poppy (*Papaver rhoeas*), *Raphanus raphanistrum*, broad-leaf dock (*Rumex obtusifolius*), Russian thistle (*Salsola kali*), wild mustard (*Sinapis arvensis*), *Sonchus arvensis, Thlaspi arvense, Tagetes minuta, Richardia brasiliensis, Plantago major, Plantago lanceolata*, bird's-eye speedwell (*Veronica persica*), pigweed (*Amaranthus retroflexus*), winter rape (*Brassica napus*), lambsquarters (*Chenopodium album*), Canada thistle (*Cirsium arvense*), nutsedge (*Cyperus esculentus*), poinsettia (*Euphorbiaheterophylla*), prickly lettuce (*Lactuca serriola*), purple deadnettle (*Lamium purpureum*), wild chamomile (*Matricaria chamomilla*), false chamomile (*Matricaria inodora*), field chamomile (*Anthemis arvensis*), common buckwheat (*Fagopyrum esculentum*), wild buckwheat (*Polygonum convulvus*), giant foxtail (*Setaria faberi*), green foxtail (*Setaria viridis*), common sorghum (*Sorghum vulgare*), wild pansy (*Viola tricolor*), or combinations thereof.

The compositions described herein can be used to control herbicide resistant or tolerant weeds. The methods employing the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones), photosystem II inhibitors (e.g., phenylcarbamates, pyridazinones, triazines, triazinones, uracils, amides, ureas, benzothiadiazinones, nitriles, phenylpyridazines), acetyl CoA carboxylase (ACCase) inhibitors (e.g., aryloxyphenoxypropionates, cyclohexanediones, phenylpyrazolines), synthetic auxins (e.g., benzoic acids, phenoxycarboxylic acids, pyridine carboxylates, quinoline carboxylic acids), auxin transport inhibitors (e.g., phthalamates, semicarbazones), photosystem I inhibitors (e.g., bipyridyliums), 5-enolpyruvylshikimate-3-phosphate (EPSP) synthase inhibitors (e.g., glyphosate), glutamine synthetase inhibitors (e.g., glufosinate, bialaphos), microtubule assembly inhibitors (e.g., benzamides, benzoic acids, dinitroanilines, phosphoramidates, pyridines), mitosis inhibitors (e.g., carbamates), very long chain fatty acid (VLCFA) inhibitors (e.g., acetamides, chloroacetamides, oxyacetamides, tetrazolinones), fatty acid and lipid synthesis inhibitors (e.g., phosphorodithioates, thiocarbamates, benzofuranes, chlorocarbonic acids), protoporphyrinogen oxidase (PPO) inhibitors (e.g., diphenylethers, N-phenylphthalimides, oxadiazoles, oxazolidinediones, phenylpyrazoles, pyrimidindiones, thiadiazoles, triazolinones), carotenoid biosynthesis inhibitors (e.g., clomazone, amitrole, aclonifen), phytoene desaturase (PDS) inhibitors (e.g., amides, anilidex, furanones, phenoxybutan-amides, pyridiazinones, pyridines), 4-hydroxyphenyl-pyruvate-dioxygenase (HPPD) inhibitors (e.g., callistemones, isoxazoles, pyrazoles, triketones), cellulose biosynthesis inhibitors (e.g., nitriles, benzamides, quinclorac, triazolocarboxamides), herbicides with multiple modes of action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, biotypes with resistance or tolerance to multiple chemical classes, biotypes with resistance or tolerance to multiple herbicide modes of action, and biotypes with multiple resistance or tolerance mechanisms (e.g., target site resistance or metabolic resistance).

By way of non-limiting illustration, examples of some aspects of the present disclosure are given below. Parts and percentages are on a per weight basis unless otherwise indicated.

EXAMPLES

Greenhouse Trial Methodology—Evaluation of Postemergence Herbicidal Safening in Crops Seeds of the desired test plant species were planted in a 90:10% v/v (volume/volume) mixture of PRO-MIX® BX (Premier Tech Horticulture, Quakertown, PA, USA) and PROFILE® GREENS GRADE™ (Profile Products LLC, Buffalo Grove, IL, USA) planting mixture, which typically has a pH of 5.2 to 6.2 and an organic matter content of at least 50 percent, in plastic pots with a surface area of 103.2 square centimeters ($cm^2$). When required to ensure good germination and healthy plants, a fungicide treatment and/or other chemical or physical treatment was applied. The plants were grown for 7-36 days (d) in a greenhouse with an approximate 14-hour (h) photo-period which was maintained at about 23° C. during the day and 22° C. during the night. Nutrients and water were added on a regular basis and supplemental lighting was provided with overhead metal halide 1000-Watt lamps as necessary. The plants were employed for testing when they reached the second or third true leaf stage.

Emulsifiable concentrates of each of each pyridine carboxylate herbicide (Compound A or Compound B) were prepared at 100 grams acid equivalent per liter (g ae/L). An aliquot of each emulsifiable concentrate was placed in a 25 mL glass vial and diluted with an aqueous mixture of 1.25% (v/v) ACTIROB® B esterified rapeseed oil (Bayer Crop Science, Research Triangle Park, NC, USA) or MSO® Concentrate with LECI-TECH® methylated soybean oil (Loveland Products, Loveland, CO, USA) to obtain concentrated stock solutions at the highest application rate for each herbicide, based upon a 12 milliliter (mL) application volume at a rate of 187 liters per hectare (L/ha). The concentrated stock solutions were further diluted with an aqueous mixture of 1.25% v/v ACTIROB® B or MSO® Concentrate with LECI-TECH® to obtain stock solutions at reduced application rates for each herbicide. Spray solutions of the herbicide combinations (Compound A or Compound B plus safener) were prepared by adding weighed amounts or aliquots of the azole carboxylate safener to the stock solutions of Compound A or Compound B to form 12-mL spray solutions in two-way combinations.

The spray solutions were applied to the plant material with an overhead Mandel track sprayer equipped with 8002E nozzles calibrated to deliver 187 L/ha over an application area of 0.503 square meters ($m^2$) at a spray height of 18 inches (43 centimeters (cm)) above the average plant canopy. Control plants were sprayed in the same manner with the solvent blank. All herbicide (component a) application rates are given as "g ae/ha" and all safener (component b) application rates are given as "g ai/ha."

The treated plants and control plants were placed in a greenhouse as described above and watered by sub-irrigation to prevent wash-off of the test compounds. After 20-22 d, the condition of the test plants as compared with that of the control plants was determined visually and scored on a scale of 0 to 100 percent where 0 corresponds to no injury and 100 corresponds to complete kill.

The details of the safened compositions and the crops tested are specified in the following Examples.

Example 1

A safened composition comprising fenchlorazole-ethyl and Compound A was tested on spring wheat (TRZAS) and spring barley (HORVS), and the phytotoxicity of the safened composition on each crop was measured. In addition, the efficacy of the safened compositions on undesirable vegetation, including winter rape (BRSNW, *Brassica napus*), wild chamomile (MATCH, *Matricaria chamomilla*), and Russian thistle (SASKR, *Salsola kali*), was measured.

The results are summarized in Table 1 below.

TABLE 1

Safening of Effects (% visual injury) of Fenchlorazole-ethyl and Compound A on grain crops and weeds.

| Application rate (g/ha) | Compound A | 20 | 0 | 0 | 0 | 20 | 20 | 20 |
|---|---|---|---|---|---|---|---|---|
| | Fenchlorazole-ethyl | 0 | 10 | 20 | 40 | 10 | 20 | 40 |
| Herbicide: Safener Ratio | | | | | | 2:1 | 1:1 | 1:2 |
| TRZAS | Ob | 25 | 0 | 0 | 0 | 0 | 0 | 0 |
| | Ex | — | — | — | — | 25 | 25 | 25 |
| | Δ | | | | | −25 | −25 | −25 |
| HORVS | Ob | 0 | 0 | 0 | 0 | 0 | 0 | 0 |
| | Ex | — | — | — | — | 0 | 0 | 0 |
| | Δ | | | | | 0 | 0 | 0 |
| BRSNW | Ob | 95 | 0 | 0 | 0 | | 80 | 95 |
| | Ex | — | — | — | — | | 95 | 95 |
| | Δ | | | | | | −15 | 0 |

TABLE 1-continued

Safening of Effects (% visual injury) of
Fenchlorazole-ethyl and Compound A on grain crops and weeds.

| | | | | | | | | |
|---|---|---|---|---|---|---|---|---|
| MATCH | Ob | 50 | 0 | 0 | 0 | | 50 | 50 |
| | Ex | — | — | — | — | | 50 | 50 |
| | Δ | | | | | | 0 | 0 |
| SASKR | Ob | 60 | 0 | 0 | 0 | | 65 | 65 |
| | Ex | — | — | — | — | | 60 | 60 |
| | Δ | | | | | | 5 | 5 | g/ha = grams per hectare
TRZAS = *Triticum aestivum* (spring wheat)
HORVS = *Hordeum vulgare* (spring barley)
BRSNW = *Brassica napus* (winter rape)
MATCH = *Matricaria chamomilla* (wild chamomile)
SASKR = *Salsola kali* (Russian thistle)

Example 2

A safened composition comprising mefenpyr-diethyl and Compound A was tested on spring barley (HORVS), spring wheat (TRZAS), and winter wheat (TRZAW), and the phytotoxicity of the safened composition on each crop was measured.

The results are summarized in Table 2 below.

TABLE 2

Safening of Effects (% visual injury) of Mefenpyr-diethyl and Compound A on grain crops.

| Application rate (g/ha) | Compound A | 40 | 0 | 0 | 0 | 0 | 40 | 40 | 40 | 40 |
|---|---|---|---|---|---|---|---|---|---|---|
| | Mefenpyr-diethyl | 0 | 20 | 40 | 80 | 120 | 20 | 40 | 80 | 120 |
| Herbicide: Safener Ratio | | | | | | | 2:1 | 1:1 | 1:2 | 1:3 |
| HORVS | Ob | 17 | 0 | 0 | 0 | 0 | 0 | 0 | 0 | 0 |
| | Ex | — | — | — | — | — | 17 | 17 | 17 | 17 |
| | Δ | | | | | | −17 | −17 | −17 | −17 |
| TRZAS | Ob | 23 | 0 | 0 | 0 | 0 | 0 | 0 | 0 | 0 |
| | Ex | — | — | — | — | — | 23 | 23 | 23 | 23 |
| | Δ | | | | | | −23 | −23 | −23 | −23 |
| TRZAW | Ob | 25 | 0 | 0 | 0 | 0 | 0 | 0 | 0 | 0 |
| | Ex | — | — | — | — | — | 25 | 25 | 25 | 25 |
| | Δ | | | | | | −25 | −25 | −25 | −25 | g/ha = grams per hectare
HORVS = *Hordeum vulgare* (spring barley)
TRZAS = *Triticum aestivum* (spring wheat)
TRZAW = *Triticum aestivum* (winter wheat)

Example 3

A safened composition comprising mefenpyr-diethyl and Compound A was tested on spring wheat (TRZAS), and the phytotoxicity of the safened composition on this crop was measured. In addition, the efficacy of the safened compositions on undesirable vegetation, including pigweed (AMARE, *Amaranthus retroflexus*), nutsedge (CYPES, *Cyperus esculentus*), and common sunflower (HELAN, *Helianthus annuus*), was measured.

The results are summarized in Table 3 below.

TABLE 3

Safening of Effects (% visual injury) of Mefenpyr-diethyl and Compound A on grain crops and weeds.

| Application rate (g/ha) | Compound A | 40 | 0 | 0 | 0 | 0 | 40 | 40 | 40 | 40 |
|---|---|---|---|---|---|---|---|---|---|---|
| | Mefenpyr-diethyl | 0 | 20 | 40 | 80 | 120 | 20 | 40 | 80 | 120 |
| Herbicide: Safener Ratio | | | | | | | 2:1 | 1:1 | 1:2 | 1:3 |
| TRZAS | Ob | 30 | 0 | 0 | 0 | 0 | 0 | 0 | 0 | 5 |
| | Ex | — | — | — | — | — | 30 | 30 | 30 | 30 |
| | Δ | | | | | | −30 | −30 | −30 | −25 |
| AMARE | Ob | 100 | 0 | 0 | 0 | 0 | 100 | 100 | 100 | 100 |
| | Ex | — | — | — | — | — | 100 | 100 | 100 | 100 |
| | Δ | | | | | | 0 | 0 | 0 | 0 |
| CYPES | Ob | 73 | 0 | 0 | 0 | 0 | 85 | 85 | 87 | 85 |
| | Ex | — | — | — | — | — | 73 | 73 | 73 | 73 |
| | Δ | | | | | | 13 | 13 | 14 | 13 |

TABLE 3-continued

Safening of Effects (% visual injury) of Mefenpyr-diethyl and Compound A on grain crops and weeds.

| | | | | | | | | | | |
|---|---|---|---|---|---|---|---|---|---|---|
| HELAN | Ob | 100 | 0 | 0 | 0 | 0 | 100 | 100 | 100 | 100 |
| | Ex | | — | — | — | — | — | 100 | 100 | 100 | 100 |
| | Δ | | | | | | | 0 | 0 | 0 | 0 | g/ha = grams per hectare
TRZAS = *Triticum aestivum* (spring wheat)
AMARE = *Amaranthus retroflexus* (pigweed)
CYPES = *Cyperus esculentus* (nutsedge)
HELAN = *Helianthus annuus* (common sunflower)

Example 4

A safened composition comprising mefenpyr-diethyl and Compound A was tested on spring wheat (TRZAS) and spring barley (HORVS), and the phytotoxicity of the safened composition on each crop was measured. In addition, the efficacy of the safened compositions on undesirable vegetation, including wild chamomile (MATCH, *Matricaria chamomilla*), and Russian thistle (SASKR, *Salsola kali*), was measured.

The results are summarized in Table 4 below.

TABLE 4

Safening of Effects (% visual injury) of Mefenpyr-diethyl and Compound A on grain crops and weeds.

| Application rate (g/ha) | Compound A | 20 | 0 | 0 | 0 | 20 | 20 | 20 |
|---|---|---|---|---|---|---|---|---|
| | Mefenpyr-diethyl | 0 | 10 | 20 | 40 | 10 | 20 | 40 |
| Herbicide: Safener Ratio | | | | | | 2:1 | 1:1 | 1:2 |
| TRZAS | Ob | 25 | 0 | 0 | 0 | 0 | 3 | 0 |
| | Ex | — | — | — | — | 25 | 25 | 25 |
| | Δ | | | | | -25 | -23 | -25 |
| HORVS | Ob | 0 | 0 | 0 | 0 | 0 | 0 | 0 |
| | Ex | — | — | — | — | 0 | 0 | 0 |
| | Δ | | | | | 0 | 0 | 0 |

TABLE 4-continued

Safening of Effects (% visual injury) of Mefenpyr-diethyl and Compound A on grain crops and weeds.

| | | | | | | | | |
|---|---|---|---|---|---|---|---|---|
| MATCH | Ob | 50 | 0 | 0 | 0 | | 60 | 60 |
| | Ex | — | — | — | — | | 50 | 50 |
| | Δ | | | | | | 10 | 10 |
| SASKR | Ob | 60 | 0 | 0 | 0 | | 65 | 65 |
| | Ex | — | — | — | — | | 60 | 60 |
| | Δ | | | | | | 5 | 5 | g/ha = grams per hectare
TRZAS = *Triticum aestivum* (spring wheat)
HORVS = *Hordeum vulgare* (spring barley)
MATCH = *Matricaria chamomilla* (wild chamomile)
SASKR = *Salsola kali* (Russian thistle)

Example 5

A safened composition comprising mefenpyr-diethyl and Compound A was tested on maize (ZEAMX), and the phytotoxicity of the safened composition on this crop was measured. In addition, the efficacy of the safened compositions on undesirable vegetation, including pigweed (AMARE, *Amaranthus retroflexus*), nutsedge (CYPES, *Cyperus esculentus*), and common sunflower (HELAN, *Helianthus annuus*), was measured.

The results are summarized in Table 5.

TABLE 5

Safening of Effects (% visual injury) of Mefenpyr-diethyl and Compound A on maize and weeds.

| Application rate (g/ha) | Compound A | 40 | 0 | 0 | 0 | 0 | 40 | 40 | 40 | 40 |
|---|---|---|---|---|---|---|---|---|---|---|
| | Mefenpyr-diethyl | 0 | 20 | 40 | 80 | 120 | 20 | 40 | 80 | 120 |
| Herbicide: Safener Ratio | | | | | | | 2:1 | 1:1 | 1:2 | 1:3 |
| ZEAMX | Ob | 55 | 0 | 0 | 0 | 0 | 35 | 28 | 25 | 20 |
| | Ex | — | — | — | — | — | 55 | 55 | 55 | 55 |
| | Δ | | | | | | -20 | -28 | -30 | -35 |
| AMARE | Ob | 100 | 0 | 0 | 0 | 0 | 100 | 100 | 100 | 100 |
| | Ex | — | — | — | — | — | 100 | 100 | 100 | 100 |
| | Δ | | | | | | 0 | 0 | 0 | 0 |
| CYPES | Ob | 73 | 0 | 0 | 0 | 0 | 85 | 85 | 87 | 85 |
| | Ex | — | — | — | — | — | 73 | 73 | 73 | 73 |
| | Δ | | | | | | 13 | 13 | 14 | 13 |
| HELAN | Ob | 100 | 0 | 0 | 0 | 0 | 100 | 100 | 100 | 100 |
| | Ex | — | — | — | — | — | 100 | 100 | 100 | 100 |
| | Δ | | | | | | 0 | 0 | 0 | 0 | g/ha = grams per hectare
ZEAMX = *Zea mays* (maize)
AMARE = *Amaranthus retroflexus* (pigweed)
CYPES = *Cyperus esculentus* (nutsedge)
HELAN = *Helianthus annuus* (common sunflower)

Example 6

A safened composition comprising fenchlorazole and Compound A was tested on winter wheat (TRZAW), rice (ORYSA), and maize (ZEAMX), and the phytotoxicity of the safened composition on the crops was measured. In addition, the efficacy of the safened compositions on undesirable vegetation, including velvetleaf (ABUTH, *Abutilon theophrasti*), blackgrass (ALOMY, *Alopecurus myosuroides*), pigweed (AMARE, *Amaranthus retroflexus*), wild oat (AVEFA, *Avena fatua*), winter rape (BRSNW, *Brassica napus*), common lambsquarters (CHEAL, *Chenopodium album* L.), Canada thistle (CIRAR, *Cirsium arvense*), nutsedge (CYPES, *Cyperus esculentus*), large crabgrass (DIGSA, *Digitaria sanguinalis*), barnyardgrass (ECHCG, *Echinochloa crus-galli*), Canada horseweed (ERICA, *Erigeron canadensis*), soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), herbicide-resistant kochia (KCHSC-R, *Kochia scoparia*), Chinese sprangletop (LEFCH, *Leptochloa chinensis*), Italian ryegrass (LOLMU, *Lolium multiflorum*), wild buckwheat (POLCO, *Polygonum convolvulus*), giant foxtail (SETFA, *Setaria faberi*), Johnson grass (SORHA, *Sorghum halepense*), and wild pansy (VIOTR, *Viola tricolor*) was measured.

The results are summarized in Table 6 below.

TABLE 6

Safening of Effects (% visual injury) of Fenchlorazole and Compound A on crops and weeds.

| Application rate (g/ha) | Compound A | 20 | 0 | 0 | 0 | 20 | 20 | 20 |
|---|---|---|---|---|---|---|---|---|
| | Fenchlorazole | 0 | 20 | 40 | 80 | 20 | 40 | 80 |
| Herbicide:Safener Ratio | | | | | | 1:1 | 1:2 | 1:4 |
| TRZAW | Ob | 25 | 0 | 0 | 0 | 0 | 0 | 0 |
| | Ex | — | — | — | — | 25 | 25 | 25 |
| | Δ | | | | | −25 | −25 | −25 |
| ORYSA | Ob | 10 | 0 | 0 | 0 | 10 | 10 | 15 |
| | Ex | — | — | — | — | 10 | 10 | 10 |
| | Δ | | | | | 0 | 0 | 5 |
| ZEAMX | Ob | 13 | 0 | 0 | 0 | 5 | 10 | 10 |
| | Ex | — | — | — | — | 13 | 13 | 13 |
| | Δ | | | | | −8 | −3 | −3 |
| ABUTH | Ob | 95 | 0 | 0 | 0 | 95 | 97 | 97 |
| | Ex | — | — | — | — | 95 | 95 | 95 |
| | Δ | | | | | 0 | 2 | 2 |
| ALOMY | Ob | 0 | 0 | 0 | 0 | 0 | 0 | 0 |
| | Ex | — | — | — | — | 0 | 0 | 0 |
| | Δ | | | | | 0 | 0 | 0 |
| AMARE | Ob | 93 | 0 | 0 | 0 | 100 | 100 | 100 |
| | Ex | — | — | — | — | 93 | 93 | 93 |
| | Δ | | | | | 7 | 7 | 7 |
| AVEFA | Ob | 0 | 0 | 0 | 0 | 0 | 0 | 0 |
| | Ex | — | — | — | — | 0 | 0 | 0 |
| | Δ | | | | | 0 | 0 | 0 |
| BRSNW | Ob | 85 | 0 | 0 | 0 | 95 | 90 | 100 |
| | Ex | — | — | — | — | 85 | 85 | 85 |
| | Δ | | | | | 10 | −5 | 15 |
| CHEAL | Ob | 88 | 0 | 0 | 0 | 100 | 100 | 100 |
| | Ex | — | — | — | — | 88 | 88 | 88 |
| | Δ | | | | | 12 | 12 | 12 |
| CIRAR | Ob | 95 | 0 | 0 | 0 | 70 | 70 | 65 |
| | Ex | — | — | — | — | 95 | 95 | 95 |
| | Δ | | | | | −25 | −25 | −30 |
| CYPES | Ob | 30 | 0 | 0 | 0 | 30 | 35 | 35 |
| | Ex | — | — | — | — | 30 | 30 | 30 |
| | Δ | | | | | 0 | 5 | 5 |
| DIGSA | Ob | 30 | 0 | 0 | 0 | 40 | 10 | 10 |
| | Ex | — | — | — | — | 30 | 30 | 30 |
| | Δ | | | | | 10 | −20 | −20 |
| ECHCG | Ob | 85 | 0 | 0 | 0 | 80 | 90 | 90 |
| | Ex | — | — | — | — | 85 | 85 | 85 |
| | Δ | | | | | −5 | 5 | 5 |
| ERICA | Ob | 95 | 0 | 0 | 0 | 97 | 95 | 97 |
| | Ex | — | — | — | — | 95 | 95 | 95 |
| | Δ | | | | | 2 | 0 | 2 |
| GLXMA | Ob | 100 | 0 | 0 | 0 | 100 | 100 | 100 |
| | Ex | — | — | — | — | 100 | 100 | 100 |
| | Δ | | | | | 0 | 0 | 0 |
| HELAN | Ob | 95 | 0 | 0 | 0 | 100 | 100 | 100 |
| | Ex | — | — | — | — | 95 | 95 | 95 |
| | Δ | | | | | 5 | 5 | 5 |
| IPOHE | Ob | 0 | 0 | 0 | 0 | 0 | 0 | 0 |
| | Ex | — | — | — | — | 0 | 0 | 0 |
| | Δ | | | | | 0 | 0 | 0 |
| KCHSC | Ob | 97 | 0 | 0 | 0 | 97 | 97 | 97 |
| | Ex | — | — | — | — | 97 | 97 | 97 |
| | Δ | | | | | 0 | 0 | 0 |
| KCHSC-R | Ob | 90 | 0 | 0 | 0 | 85 | 90 | 90 |
| | Ex | — | — | — | — | 90 | 90 | 90 |
| | Δ | | | | | −5 | 0 | 0 |
| LEFCH | Ob | 60 | 0 | 0 | 0 | 30 | 30 | 30 |
| | Ex | — | — | — | — | 60 | 60 | 60 |
| | Δ | | | | | −30 | −30 | −30 |
| LOLMU | Ob | 5 | 0 | 0 | 0 | 5 | 5 | 5 |
| | Ex | — | — | — | — | 5 | 5 | 5 |
| | Δ | | | | | 0 | 0 | 0 |
| POLCO | Ob | 100 | 0 | 0 | 0 | 100 | 100 | 100 |
| | Ex | — | — | — | — | 100 | 100 | 100 |
| | Δ | | | | | 0 | 0 | 0 |
| SETFA | Ob | 65 | 0 | 0 | 0 | 75 | 70 | 60 |
| | Ex | — | — | — | — | 65 | 65 | 65 |
| | Δ | | | | | 10 | 5 | −5 |
| SORHA | Ob | 0 | 0 | 0 | 0 | 0 | 0 | 0 |
| | Ex | — | — | — | — | 0 | 0 | 0 |
| | Δ | | | | | 0 | 0 | 0 |
| VIOTR | Ob | 30 | 0 | 0 | 0 | 20 | 20 | 20 |
| | Ex | — | — | — | — | 30 | 30 | 30 |
| | Δ | | | | | −10 | −10 | −10 | g/ha = grams per hectare
TRZAW = *Triticum aestivum* (winter wheat)
ORYSA = *Oryza sativa* (common rice)
ZEAMX = *Zea mays* (maize)
ABUTH = *Abutilon theophrasti* (velvetleaf)
ALOMY = *Alopecurus myosuroides* (blackgrass)
AMARE = *Amaranthus retroflexus* (pigweed)
AVEFA = *Avena fatua* (wild oat)
BRSNW = *Brassica napus* (winter rape)
CHEAL = *Chenopodium album* L. (common lambsquarters)
CIRAR = *Cirsium arvense* (Canada thistle)
CYPES = *Cyperus esculentus* (nutsedge)
DIGSA = *Digitaria sanguinalis* (large crabgrass)
ECHCG = *Echinochloa crus-galli* (barnyardgrass)
ERICA = *Erigeron canadensis* (Canada horseweed)
GLXMA = *Glycine max* (soybean)
HELAN = *Helianthus annuus* (common sunflower)
IPOHE = *Ipomoea hederacea* (ivyleaf morningglory)
KCHSC = *Kochia scoparia* (kochia)
KCHSC-R = *Kochia scoparia* (herbicide-resistant kochia)
LEFCH = *Leptochloa chinensis* (Chinese sprangletop)
LOLMU = *Lolium multiflorum* (Italian ryegrass)
POLCO = *Polygonum convolvulus* (wild buckwheat)
SETFA = *Setaria faberi* (giant foxtail)
SORHA = *Sorghum halepense* (Johnson grass)
VIOTR = *Viola tricolor* (wild pansy)

Example 7

A safened composition comprising mefenpyr-diethyl and Compound A was tested on winter wheat (TRZAW), rice (ORYSA), and maize (ZEAMX), and the phytotoxicity of the safened composition on the crops was measured. In addition, the efficacy of the safened compositions on undesirable vegetation, including velvetleaf (ABUTH, *Abutilon theophrasti*), blackgrass (ALOMY, *Alopecurus myosuroi-* des), pigweed (AMARE, *Amaranthus retroflexus*), wild oat (AVEFA, *Avena fatua*), winter rape (BRSNW, *Brassica napus*), common lambsquarters (CHEAL, *Chenopodium album* L.), Canada thistle (CIRAR, *Cirsium arvense*), nutsedge (CYPES, *Cyperus esculentus*), large crabgrass (DIGSA, *Digitaria sanguinalis*), barnyardgrass (ECHCG, *Echinochloa crus-galli*), Canada horseweed (ERICA, *Erigeron canadensis*), soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), herbicide-resistant kochia (KCHSC-R, *Kochia scoparia*), Chinese sprangletop (LEFCH, *Leptochloa chinensis*), Italian ryegrass (LOLMU, *Lolium multiflorum*), wild buckwheat (POLCO, *Polygonum convolvulus*), giant foxtail (SETFA, *Setaria faberi*), Johnson grass (SORHA, *Sorghum halepense*), and wild pansy (VIOTR, *Viola tricolor*) was measured.

The results are summarized in Table 7 below.

TABLE 7

Safening of Effects (% visual injury) of Mefenpyr-diethyl and Compound A on crops and weeds.

| Application rate (g/ha) | Compound A | 20 | 0 | 0 | 0 | 20 | 20 | 20 |
|---|---|---|---|---|---|---|---|---|
| | Mefenpyr-diethyl | 0 | 20 | 40 | 80 | 20 | 40 | 80 |
| Herbicide: Safener Ratio | | | | | | 1:1 | 1:2 | 1:4 |
| TRZAW | Ob | 25 | 0 | 0 | 0 | 0 | 0 | 0 |
| | Ex | — | — | — | — | 25 | 25 | 25 |
| | Δ | | | | | −25 | −25 | −25 |
| ORYSA | Ob | 10 | 0 | 0 | 0 | 10 | 0 | 5 |
| | Ex | — | — | — | — | 10 | 10 | 10 |
| | Δ | | | | | 0 | −10 | −5 |
| ZEAMX | Ob | 13 | 0 | 0 | 0 | 5 | 10 | 0 |
| | Ex | — | — | — | — | 13 | 13 | 13 |
| | Δ | | | | | −8 | −3 | −13 |
| ABUTH | Ob | 95 | 0 | 0 | 0 | 95 | 100 | 97 |
| | Ex | — | — | — | — | 95 | 95 | 95 |
| | Δ | | | | | 0 | 5 | 2 |
| ALOMY | Ob | 0 | 0 | 0 | 0 | 0 | 0 | 0 |
| | Ex | — | — | — | — | 0 | 0 | 0 |
| | Δ | | | | | 0 | 0 | 0 |
| AMARE | Ob | 93 | 0 | 0 | 0 | 100 | 100 | 100 |
| | Ex | — | — | — | — | 93 | 93 | 93 |
| | Δ | | | | | 7 | 7 | 7 |
| AVEFA | Ob | 0 | 0 | 0 | 0 | 0 | 0 | 0 |
| | Ex | — | — | — | — | 0 | 0 | 0 |
| | Δ | | | | | 0 | 0 | 0 |
| BRSNW | Ob | 85 | 0 | 0 | 0 | 100 | 90 | 100 |
| | Ex | — | — | — | — | 85 | 85 | 85 |
| | Δ | | | | | 15 | 5 | 15 |
| CHEAL | Ob | 88 | 0 | 0 | 0 | 100 | 100 | 100 |
| | Ex | — | — | — | — | 88 | 88 | 88 |
| | Δ | | | | | 12 | 12 | 12 |
| CIRAR | Ob | 95 | 0 | 0 | 0 | 100 | 80 | 85 |
| | Ex | — | — | — | — | 95 | 95 | 95 |
| | Δ | | | | | 5 | −15 | −10 |
| CYPES | Ob | 30 | 0 | 0 | 0 | 65 | 30 | 10 |
| | Ex | — | — | — | — | 30 | 30 | 30 |
| | Δ | | | | | 35 | 0 | −20 |
| DIGSA | Ob | 30 | 0 | 0 | 0 | 45 | 40 | 35 |
| | Ex | — | — | — | — | 30 | 30 | 30 |
| | Δ | | | | | 15 | 10 | 5 |
| ECHCG | Ob | 85 | 0 | 0 | 0 | 90 | 80 | 85 |
| | Ex | — | — | — | — | 85 | 85 | 85 |
| | Δ | | | | | 5 | −5 | 0 |
| ERICA | Ob | 95 | 0 | 0 | 0 | 95 | 93 | 95 |
| | Ex | — | — | — | — | 95 | 95 | 95 |
| | Δ | | | | | 0 | −2 | 0 |
| GLXMA | Ob | 100 | 0 | 0 | 0 | 100 | 100 | 100 |
| | Ex | — | — | — | — | 100 | 100 | 100 |
| | Δ | | | | | 0 | 0 | 0 |
| HELAN | Ob | 95 | 0 | 0 | 0 | 95 | 100 | 100 |
| | Ex | — | — | — | — | 95 | 95 | 95 |
| | Δ | | | | | 0 | 5 | 5 |
| IPOHE | Ob | 0 | 0 | 0 | 0 | 0 | 0 | 0 |
| | Ex | — | — | — | — | 0 | 0 | 0 |
| | Δ | | | | | 0 | 0 | 0 |
| KCHSC | Ob | 97 | 0 | 0 | 0 | 97 | 95 | 97 |
| | Ex | — | — | — | — | 97 | 97 | 97 |
| | Δ | | | | | 0 | −2 | 0 |
| KCHSC-R | Ob | 90 | 0 | 0 | 0 | 80 | 85 | 85 |
| | Ex | — | — | — | — | 90 | 90 | 90 |
| | Δ | | | | | −10 | −5 | −5 |
| LEFCH | Ob | 60 | 0 | 0 | 0 | 30 | 30 | 30 |
| | Ex | — | — | — | — | 60 | 60 | 60 |
| | Δ | | | | | −30 | −30 | −30 |
| LOLMU | Ob | 5 | 0 | 0 | 0 | 5 | 5 | 5 |
| | Ex | — | — | — | — | 5 | 5 | 5 |
| | Δ | | | | | 0 | 0 | 0 |
| POLCO | Ob | 100 | 0 | 0 | 0 | 100 | 100 | 100 |
| | Ex | — | — | — | — | 100 | 100 | 100 |
| | Δ | | | | | 0 | 0 | 0 |
| SETFA | Ob | 65 | 0 | 0 | 0 | 50 | 65 | 60 |
| | Ex | — | — | — | — | 65 | 65 | 65 |
| | Δ | | | | | −15 | 0 | −5 |
| SORHA | Ob | 0 | 0 | 0 | 0 | 0 | 0 | 0 |
| | Ex | — | — | — | — | 0 | 0 | 0 |
| | Δ | | | | | 0 | 0 | 0 |
| VIOTR | Ob | 30 | 0 | 0 | 0 | 60 | 60 | 50 |
| | Ex | — | — | — | — | 30 | 30 | 30 |
| | Δ | | | | | 30 | 30 | 20 | g/ha = grams per hectare
TRZAW = *Triticum aestivum* (winter wheat)
ORYSA = *Oryza sativa* (common rice)
ZEAMX = *Zea mays* (maize)
ABUTH = *Abutilon theophrasti* (velvetleaf)
ALOMY = *Alopecurus myosuroides* (blackgrass)
AMARE = *Amaranthus retroflexus* (pigweed)
AVEFA = *Avena fatua* (wild oat)
BRSNW = *Brassica napus* (winter rape)
CHEAL = *Chenopodium album* L. (common lambsquarters)
CIRAR = *Cirsium arvense* (Canada thistle)
CYPES = *Cyperus esculentus* (nutsedge)
DIGSA = *Digitaria sanguinalis* (large crabgrass)
ECHCG = *Echinochloa crus-galli* (barnyardgrass)
ERICA = *Erigeron canadensis* (Canada horseweed)
GLXMA = *Glycine max* (soybean)
HELAN = *Helianthus annuus* (common sunflower)
IPOHE = *Ipomoea hederacea* (ivyleaf morningglory)
KCHSC = *Kochia scoparia* (kochia)
KCHSC-R = *Kochia scoparia* (herbicide-resistant kochia)
LEFCH = *Leptochloa chinensis* (Chinese sprangletop)
LOLMU = *Lolium multiflorum* (Italian ryegrass)
POLCO = *Polygonum convolvulus* (wild buckwheat)
SETFA = *Setaria faberi* (giant foxtail)
SORHA = *Sorghum halepense* (Johnson grass)
VIOTR = *Viola tricolor* (wild pansy)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects of the invention and are also disclosed. Other than in the examples, or where otherwise noted, all numbers expressing quantities of ingredients, reaction conditions, and so forth used in the specification and claims are to be understood to be construed in light of the number of significant digits and ordinary rounding approaches, and not as an attempt to limit the application of the doctrine of equivalents to the scope of the claims.

What is claimed is:

1. A safened composition, comprising:
(a) a pyridine carboxylate herbicide defined by Formula (I):

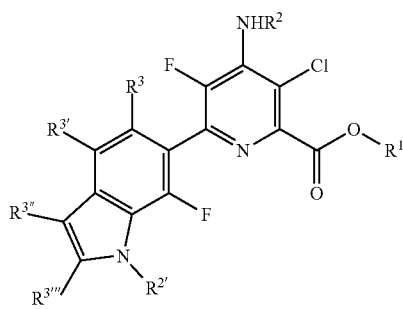

Formula (I)

wherein:
R¹ is propargyl;
R² and R²' are hydrogen;
R³, R³', R³", and R³'" are hydrogen;
or an agriculturally acceptable salt thereof; and
(b) an azole carboxylate safener or an agriculturally acceptable salt or ester thereof,
wherein the weight ratio of the pyridine carboxylate herbicide to the azole carboxylate safener is from about 1:5 to about 5:1.

2. The composition of claim 1, wherein the pyridine carboxylate herbicide compound is propargyl 4-amino-3-chloro-5-fluoro-6-(7-fluoro-1H-indol-6-yl)pyridine-2-carboxylate:

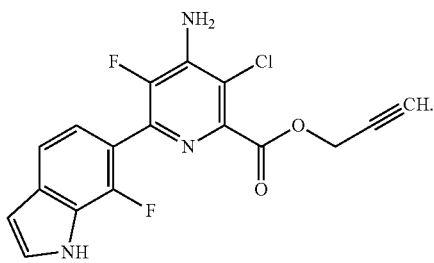 [SMILES: C#CCOC(=O)c1nc(-c2ccc3cc[nH]c3c2F)c(F)c(N)c1Cl]

3. The composition of claim 1, wherein the azole carboxylate safener is selected from the group consisting of fenchlorazole, flurazole, furilazole, isoxadifen, mefenpyr, an agriculturally acceptable salt thereof, an agriculturally acceptable ester thereof, and mixtures thereof.

4. The composition of claim 3, wherein the agriculturally acceptable ester of the azole carboxylate safener is selected from the group consisting of methyl ester, ethyl ester, diethyl ester, and combinations thereof.

5. The composition of claim 3, wherein the agriculturally acceptable salt of the azole carboxylate safener is selected from the group consisting of sodium, potassium, ammonium, monoethanolammonium, diethanolammonium, triethanolammonium, monoisopropanolammonium, diisopropanolammonium, triisopropanolammonium, choline, N,N-dimethylethanolammonium, diethylammonium, dimethylammonium, trimethylammonium, triethylammonium, isopropylammonium, and combinations thereof.

6. The composition of claim 1, wherein the composition does not include a herbicidal active ingredient in addition to (a).

7. A method of controlling vegetation, comprising applying to vegetation or an area adjacent the vegetation or applying to soil or water to limit the emergence or growth of vegetation a safened composition, comprising:
(a) a pyridine carboxylate herbicide defined by Formula (I):

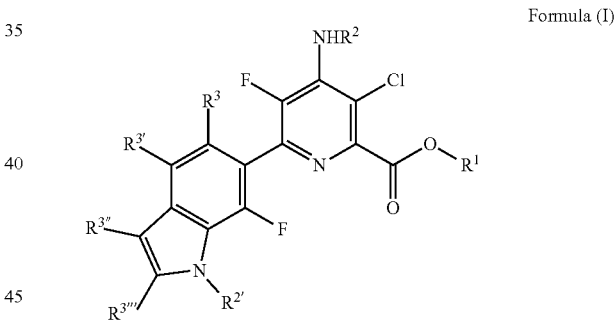

Formula (I)

wherein
R¹ is propargyl;
R² and R²' are hydrogen;
R³, R³', R³", and R³'" are hydrogen;
or an agriculturally acceptable salt thereof; and
(b) an azole carboxylate safener or an agriculturally acceptable salt or ester thereof;
wherein the herbicide is applied in an amount of at least 1 g ae/ha,
wherein the azole carboxylate safener is applied in an amount of at least 1 g ai/ha, and
wherein the weight ratio of the pyridine carboxylate herbicide to the azole carboxylate safener is from about 1:5 to about 5:1.

8. The method of claim 7, wherein the pyridine carboxylate herbicide compound is propargyl 4-amino-3-chloro-5-fluoro-6-(7-fluoro-1H-indol-6-yl)pyridine-2-carboxylate:

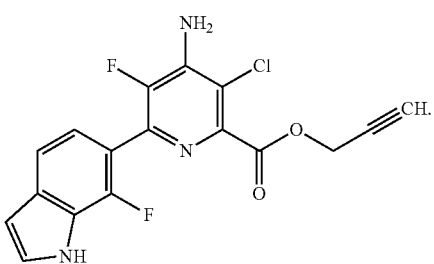 [SMILES: C#CCOC(=O)c1nc(-c2ccc3cc[nH]c3c2F)c(F)c(N)c1Cl]

9. The method of claim 7, wherein the herbicide and the safener are applied simultaneously.

10. The method of claim 7, wherein the azole carboxylate safener is selected from the group consisting of fenchlorazole, flurazole, furilazole, isoxadifen, mefenpyr, an agriculturally acceptable salt thereof, an agriculturally acceptable ester thereof, and mixtures thereof.

11. The method of claim 10, wherein the agriculturally acceptable ester of the azole carboxylate safener is selected from the group consisting of methyl ester, ethyl ester, diethyl ester, and combinations thereof.

12. The method of claim 10, wherein the agriculturally acceptable salt of the azole carboxylate safener is selected from the group consisting of sodium, potassium, ammonium, monoethanolammonium, diethanolammonium, triethanolammonium, monoisopropanolammonium, diisopropanolammonium, triisopropanolammonium, choline, N,N-dimethylethanolammonium, diethylammonium, dimethylammonium, trimethylammonium, triethylammonium, isopropylammonium, and combinations thereof.

13. The method of claim 7, wherein the herbicide is provided in amount of 1 g ae/ha to 300 g ae/ha.

14. The method of claim 7, wherein the pyridine carboxylate herbicide is applied pre-emergently or post-emergently to the vegetation and the azole carboxylate safener is applied as a seed treatment to a crop.

15. The method of claim 7, wherein the composition does not include a herbicidal active ingredient in addition to (a).

* * * * *